United States Patent
Oliveira et al.

(10) Patent No.: US 8,321,690 B2
(45) Date of Patent: Nov. 27, 2012

(54) PROTECTING DIGITAL MEDIA OF VARIOUS CONTENT TYPES

(75) Inventors: Eduardo P. Oliveira, Redmond, WA (US); Anders E. Klemets, Redmond, WA (US); Sanjay Bhatt, Redmond, WA (US); Anand Paka, Bellevue, WA (US); James M. Alkove, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 11/201,751

(22) Filed: Aug. 11, 2005

(65) Prior Publication Data

US 2007/0038873 A1 Feb. 15, 2007

(51) Int. Cl.
 *G06F 12/14* (2006.01)
(52) U.S. Cl. ........... 713/193; 713/150; 380/37; 380/277
(58) Field of Classification Search .................. 713/193, 713/150; 380/37, 277
 See application file for complete search history.

(56) References Cited

U.S. PATENT DOCUMENTS

| | | |
|---|---|---|
| 3,718,906 A | 2/1973 | Lightner |
| 4,255,811 A | 3/1981 | Adler |
| 4,323,921 A | 4/1982 | Guillou |
| 4,528,643 A | 7/1985 | Freeny, Jr. |
| 4,658,093 A | 4/1987 | Hellman |
| 4,683,553 A | 7/1987 | Mollier |
| 4,827,508 A | 5/1989 | Shear |
| 4,916,738 A | 4/1990 | Chandra et al. |
| 4,926,479 A | 5/1990 | Goldwasser et al. |
| 4,953,209 A | 8/1990 | Ryder, Sr. et al. |
| 4,977,594 A | 12/1990 | Shear |
| 5,005,170 A | 4/1991 | Nelson |
| 5,050,213 A | 9/1991 | Shear |
| 5,103,392 A | 4/1992 | Mori |
| 5,103,476 A | 4/1992 | Waite et al. |
| 5,109,413 A | 4/1992 | Comerford et al. |
| 5,117,457 A | 5/1992 | Comerford et al. |
| 5,193,573 A | 3/1993 | Chronister |
| 5,222,134 A | 6/1993 | Waite et al. |
| 5,224,166 A * | 6/1993 | Hartman, Jr. ................ 713/190 |
| 5,261,002 A | 11/1993 | Perlman et al. |
| 5,319,705 A | 6/1994 | Halter et al. |
| 5,410,598 A | 4/1995 | Shear |
| 5,410,698 A | 4/1995 | Danneels et al. |
| 5,473,692 A | 12/1995 | Davis |
| 5,490,216 A | 2/1996 | Richardson, III |
| 5,506,932 A | 4/1996 | Holmes et al. |

(Continued)

FOREIGN PATENT DOCUMENTS

CN 1498479 A 5/2004

(Continued)

OTHER PUBLICATIONS

"SMPTE Standard for Television, Audio and Film—Time and Control Code", The Society of Motion Picture and Television Engineers, Sep. 12, 1995.

PCT International Search Report and Written Opinion for Application PCT/US2006/031185 mailed on Jan. 16, 2007. pages 1-12, which is a counterpart of the above-captioned application.

(Continued)

*Primary Examiner* — Kambiz Zand
*Assistant Examiner* — Amare F Tabor
(74) *Attorney, Agent, or Firm* — Merchant & Gould PC

(57) ABSTRACT

Systems and/or methods ("tools") are described that enable a digital rights management policy to be associated with digital media having an arbitrary content type or transfer control protocol. In some embodiments, the tools encrypt data segments of a media file and add a descriptor to each of those segments. These descriptors can enable a receiver of the encrypted media file to decrypt the file and consume it according to the correct digital rights management policy.

18 Claims, 13 Drawing Sheets

U.S. PATENT DOCUMENTS

| | | | |
|---|---|---|---|
| 5,509,070 A | 4/1996 | Schull | |
| 5,629,980 A | 5/1997 | Stefik et al. | |
| 5,634,012 A | 5/1997 | Stefik et al. | |
| 5,638,443 A | 6/1997 | Stefik et al. | |
| 5,673,316 A | 9/1997 | Auerbach et al. | |
| 5,691,768 A | 11/1997 | Civanlar et al. | |
| 5,710,887 A | 1/1998 | Chelliah et al. | |
| 5,715,403 A | 2/1998 | Stefik | |
| 5,765,152 A | 6/1998 | Erickson | |
| 5,805,700 A | 9/1998 | Nardone et al. | |
| 5,809,144 A | 9/1998 | Sirbu et al. | |
| 5,845,281 A | 12/1998 | Benson et al. | |
| 5,892,900 A | 4/1999 | Ginter et al. | |
| 5,917,912 A | 6/1999 | Ginter et al. | |
| 5,953,420 A | 9/1999 | Matyas, Jr. et al. | |
| 6,073,124 A | 6/2000 | Krishnan et al. | |
| 6,078,909 A | 6/2000 | Knutson | |
| 6,094,487 A | 7/2000 | Butler et al. | |
| 6,094,684 A | 7/2000 | Pallmann | |
| 6,133,912 A | 10/2000 | Montero | |
| 6,134,243 A | 10/2000 | Jones et al. | |
| 6,189,146 B1 | 2/2001 | Misra et al. | |
| 6,205,140 B1 | 3/2001 | Putzolu et al. | |
| 6,219,652 B1 | 4/2001 | Carter et al. | |
| 6,226,618 B1 | 5/2001 | Downs et al. | |
| 6,233,567 B1 | 5/2001 | Cohen | |
| 6,269,368 B1 | 7/2001 | Diamond | |
| 6,275,531 B1 | 8/2001 | Li | |
| 6,278,478 B1 | 8/2001 | Ferriere | |
| 6,289,452 B1 | 9/2001 | Arnold et al. | |
| 6,330,670 B1 | 12/2001 | England et al. | |
| 6,343,280 B2 | 1/2002 | Clark | |
| 6,456,967 B1 | 9/2002 | Yeom | |
| 6,476,802 B1 | 11/2002 | Rose et al. | |
| 6,512,778 B1 | 1/2003 | Jones et al. | |
| 6,549,922 B1 | 4/2003 | Srivastava et al. | |
| 6,574,609 B1 | 6/2003 | Downs et al. | |
| 6,574,612 B1 | 6/2003 | Baratti et al. | |
| 6,587,837 B1 | 7/2003 | Spagna et al. | |
| 6,609,130 B1 | 8/2003 | Saulpaugh et al. | |
| 6,654,389 B1 | 11/2003 | Brunheroto et al. | |
| 6,681,017 B1 | 1/2004 | Matias et al. | |
| 6,700,895 B1 | 3/2004 | Kroll | |
| 6,742,176 B1 | 5/2004 | Million et al. | |
| 6,754,349 B1 | 6/2004 | Arthan | |
| 6,757,913 B2 | 6/2004 | Knox | |
| 6,832,319 B1 | 12/2004 | Bell et al. | |
| 6,856,997 B2 | 2/2005 | Lee et al. | |
| 6,885,748 B1 | 4/2005 | Wang | |
| 6,918,034 B1 | 7/2005 | Sengodan et al. | |
| 6,934,467 B1 | 8/2005 | Herz | |
| 6,944,296 B1* | 9/2005 | Liu et al. | 380/201 |
| 6,961,430 B1 | 11/2005 | Gaske et al. | |
| 6,965,646 B1 | 11/2005 | Firestone | |
| 6,983,049 B2 | 1/2006 | Wee et al. | |
| 6,993,137 B2 | 1/2006 | Fransdonk | |
| 7,010,032 B1 | 3/2006 | Kikuchi et al. | |
| 7,039,643 B2 | 5/2006 | Sena et al. | |
| 7,065,787 B2 | 6/2006 | Ganesan et al. | |
| 7,080,043 B2 | 7/2006 | Chase, Jr. et al. | |
| 7,093,277 B2 | 8/2006 | Perlman | |
| 7,120,250 B2* | 10/2006 | Candelore | 380/200 |
| 7,124,303 B2 | 10/2006 | Candelore et al. | |
| 7,136,577 B1 | 11/2006 | Falco | |
| 7,136,945 B2 | 11/2006 | Gibbs et al. | |
| 7,145,919 B2 | 12/2006 | Krishnarajah et al. | |
| 7,174,452 B2 | 2/2007 | Carr | |
| 7,200,668 B2 | 4/2007 | Mak et al. | |
| 7,203,316 B1 | 4/2007 | Nolte | |
| 7,209,892 B1 | 4/2007 | Galuten et al. | |
| 7,231,516 B1 | 6/2007 | Sparrell et al. | |
| 7,242,766 B1 | 7/2007 | Lyle | |
| 7,243,366 B2* | 7/2007 | Medvinsky et al. | 726/2 |
| 7,257,641 B1 | 8/2007 | VanBuskirk et al. | |
| 7,325,139 B2* | 1/2008 | Ishiguro et al. | 713/180 |
| 7,336,791 B2* | 2/2008 | Ishiguro | 380/278 |
| 7,337,320 B2* | 2/2008 | Tada et al. | 713/171 |
| 7,346,160 B2* | 3/2008 | Michaelsen | 380/28 |
| 7,350,238 B2* | 3/2008 | Abe et al. | 726/29 |
| 7,401,100 B2 | 7/2008 | Jung et al. | |
| 7,434,052 B1 | 10/2008 | Rump | |
| 7,437,771 B2 | 10/2008 | Alkove et al. | |
| 7,483,532 B2 | 1/2009 | Alkove et al. | |
| 7,536,418 B2* | 5/2009 | Buchsbaum et al. | 707/200 |
| 7,561,696 B2 | 7/2009 | Oliveira et al. | |
| 7,574,747 B2 | 8/2009 | Oliveira et al. | |
| 7,581,255 B2 | 8/2009 | Alkove et al. | |
| 7,634,816 B2 | 12/2009 | Alkove et al. | |
| 7,636,738 B2 | 12/2009 | Shibata et al. | |
| 7,684,566 B2 | 3/2010 | Oliveira et al. | |
| 7,693,280 B2 | 4/2010 | Evans et al. | |
| 7,720,096 B2 | 5/2010 | Klemets | |
| 7,738,778 B2 | 6/2010 | Agnihotri et al. | |
| 7,769,880 B2 | 8/2010 | Paka et al. | |
| 7,801,847 B2 | 9/2010 | Kiilerich et al. | |
| 7,876,896 B2 | 1/2011 | Alkove et al. | |
| 7,882,257 B2 | 2/2011 | Kerr et al. | |
| 2001/0052077 A1 | 12/2001 | Fung et al. | |
| 2001/0052135 A1 | 12/2001 | Balakrishnan et al. | |
| 2001/0056539 A1 | 12/2001 | Pavlin et al. | |
| 2002/0002674 A1 | 1/2002 | Grimes et al. | |
| 2002/0004773 A1 | 1/2002 | Xu et al. | |
| 2002/0013772 A1 | 1/2002 | Peinado | |
| 2002/0082845 A1 | 6/2002 | Sato | |
| 2002/0088136 A1 | 7/2002 | Tseng | |
| 2002/0107806 A1 | 8/2002 | Higashi et al. | |
| 2002/0138619 A1 | 9/2002 | Ramaley et al. | |
| 2002/0152393 A1 | 10/2002 | Thoma et al. | |
| 2002/0157002 A1 | 10/2002 | Messerges et al. | |
| 2002/0164018 A1 | 11/2002 | Wee et al. | |
| 2002/0174135 A1 | 11/2002 | Pellegrin et al. | |
| 2002/0194010 A1 | 12/2002 | Bergler et al. | |
| 2002/0198846 A1 | 12/2002 | Lao | |
| 2003/0001978 A1 | 1/2003 | Smith et al. | |
| 2003/0041257 A1 | 2/2003 | Wee et al. | |
| 2003/0056118 A1 | 3/2003 | Troyansky et al. | |
| 2003/0065918 A1 | 4/2003 | Willey | |
| 2003/0068040 A1 | 4/2003 | Wee et al. | |
| 2003/0070081 A1 | 4/2003 | Wee et al. | |
| 2003/0081592 A1 | 5/2003 | Krishnarajah et al. | |
| 2003/0081776 A1 | 5/2003 | Candelore | |
| 2003/0084306 A1 | 5/2003 | Abburi et al. | |
| 2003/0103243 A1 | 6/2003 | Watanabe et al. | |
| 2003/0126608 A1 | 7/2003 | Safadi et al. | |
| 2003/0131353 A1 | 7/2003 | Blom et al. | |
| 2003/0152223 A1 | 8/2003 | Yamada | |
| 2003/0159140 A1 | 8/2003 | Candelore | |
| 2003/0161473 A1 | 8/2003 | Fransdonk | |
| 2003/0182450 A1 | 9/2003 | Ong et al. | |
| 2003/0185542 A1 | 10/2003 | McVeigh et al. | |
| 2003/0194094 A1 | 10/2003 | Lampson et al. | |
| 2003/0217011 A1 | 11/2003 | Peinado et al. | |
| 2004/0001592 A1 | 1/2004 | Akiwumi-Assani et al. | |
| 2004/0003268 A1 | 1/2004 | Bourne et al. | |
| 2004/0010469 A1 | 1/2004 | Lenard et al. | |
| 2004/0042451 A1 | 3/2004 | Takaku | |
| 2004/0054930 A1 | 3/2004 | Walker et al. | |
| 2004/0064500 A1 | 4/2004 | Kolar et al. | |
| 2004/0078822 A1 | 4/2004 | Breen et al. | |
| 2004/0088557 A1 | 5/2004 | Malcolm et al. | |
| 2004/0098583 A1 | 5/2004 | Weber | |
| 2004/0123094 A1 | 6/2004 | Sprunk | |
| 2004/0125757 A1 | 7/2004 | Mela et al. | |
| 2004/0125791 A1 | 7/2004 | Hoffmann | |
| 2004/0139336 A1 | 7/2004 | McLean et al. | |
| 2004/0143736 A1 | 7/2004 | Cross et al. | |
| 2004/0170277 A1 | 9/2004 | Iwamura et al. | |
| 2004/0181490 A1 | 9/2004 | Gordon et al. | |
| 2004/0186854 A1 | 9/2004 | Choi | |
| 2004/0193680 A1 | 9/2004 | Gibbs et al. | |
| 2004/0237750 A1 | 12/2004 | Smith et al. | |
| 2004/0242269 A1 | 12/2004 | Fadell | |
| 2004/0249759 A1* | 12/2004 | Higashi et al. | 705/59 |
| 2004/0249815 A1 | 12/2004 | Lee | |
| 2004/0260786 A1 | 12/2004 | Barile | |
| 2005/0002402 A1 | 1/2005 | Fairman | |
| 2005/0002525 A1 | 1/2005 | Alkove et al. | |

| | | | | | | |
|---|---|---|---|---|---|---|
| 2005/0005760 A1 | 1/2005 | Hull et al. | | JP | 2000-134193 | 5/2000 |
| 2005/0008240 A1 | 1/2005 | Bamerji et al. | | JP | 2000287192 A | 10/2000 |
| 2005/0033967 A1 | 2/2005 | Morino et al. | | JP | 2001-075871 | 3/2001 |
| 2005/0069039 A1 | 3/2005 | Crinon | | JP | 2002044135 A | 2/2002 |
| 2005/0071278 A1 | 3/2005 | Simelius | | JP | 2002-175084 | 6/2002 |
| 2005/0099869 A1 | 5/2005 | Crinon et al. | | JP | 2002-342518 | 11/2002 |
| 2005/0108746 A1 | 5/2005 | Futagami et al. | | JP | 2003-124927 | 4/2003 |
| 2005/0114664 A1 | 5/2005 | Davin | | JP | 2003-152544 | 5/2003 |
| 2005/0144470 A1* | 6/2005 | Takashima et al. ........... 713/189 | | JP | 2003-224556 | 8/2003 |
| 2005/0157727 A1 | 7/2005 | Date et al. | | JP | 2003-319322 | 11/2003 |
| 2005/0163052 A1 | 7/2005 | Savage et al. | | JP | 2004-046833 | 2/2004 |
| 2005/0163093 A1 | 7/2005 | Garg et al. | | JP | 2004-158936 | 6/2004 |
| 2005/0169303 A1 | 8/2005 | Toma et al. | | JP | 2004-282731 | 10/2004 |
| 2005/0169444 A1 | 8/2005 | Inon | | JP | 2004-287937 | 10/2004 |
| 2005/0177875 A1 | 8/2005 | Kamperman et al. | | JP | 2004-328706 | 11/2004 |
| 2005/0187879 A1 | 8/2005 | Zigmond et al. | | JP | 2004-537191 | 12/2004 |
| 2005/0216413 A1 | 9/2005 | Murakami et al. | | JP | 2005-109861 | 4/2005 |
| 2005/0246451 A1 | 11/2005 | Silverman et al. | | JP | 2005-513664 | 5/2005 |
| 2005/0254526 A1 | 11/2005 | Wang et al. | | KR | 2001-51534 | 6/2001 |
| 2005/0265555 A1 | 12/2005 | Pippuri | | KR | 1020030011837 A | 2/2003 |
| 2005/0286497 A1 | 12/2005 | Zutaut et al. | | KR | 2003-19398 | 3/2003 |
| 2005/0289617 A1 | 12/2005 | Safadi et al. | | KR | 2003-27066 | 4/2003 |
| 2006/0007479 A1 | 1/2006 | Henry et al. | | RU | 2144736 | 1/2000 |
| 2006/0020636 A1 | 1/2006 | Murotani | | RU | 2159507 | 11/2000 |
| 2006/0031889 A1 | 2/2006 | Bennett et al. | | RU | 2163745 | 2/2001 |
| 2006/0069803 A1 | 3/2006 | Clark et al. | | RU | 2201036 | 3/2003 |
| 2006/0104356 A1 | 5/2006 | Crinon | | RU | 2003133468 | 5/2005 |
| 2006/0123064 A1 | 6/2006 | Kim et al. | | TW | 536893 | 6/2003 |
| 2006/0130104 A1 | 6/2006 | Budagavi | | TW | 200301635 | 7/2003 |
| 2006/0161635 A1 | 7/2006 | Lamkin et al. | | WO | WO 93/01550 | 1/1993 |
| 2006/0167985 A1 | 7/2006 | Albanese et al. | | WO | WO 96/13013 | 5/1996 |
| 2006/0184573 A1 | 8/2006 | Koori | | WO | WO 96/24092 | 8/1996 |
| 2006/0184790 A1 | 8/2006 | Oliveira et al. | | WO | WO 96/27155 | 9/1996 |
| 2006/0190408 A1 | 8/2006 | Cook et al. | | WO | WO 97/25798 | 7/1997 |
| 2006/0227965 A1 | 10/2006 | Zhu et al. | | WO | WO 97/43761 | 11/1997 |
| 2006/0242078 A1 | 10/2006 | Evans et al. | | WO | WO 98/09209 | 3/1998 |
| 2006/0242079 A1 | 10/2006 | Evans et al. | | WO | WO 98/10381 | 3/1998 |
| 2006/0242080 A1 | 10/2006 | Van Dyke et al. | | WO | WO 98/21679 | 5/1998 |
| 2006/0262732 A1 | 11/2006 | Joutsenvirta et al. | | WO | WO 98/24037 | 6/1998 |
| 2006/0268099 A1 | 11/2006 | Potrebic et al. | | WO | WO 98/37481 | 8/1998 |
| 2006/0291475 A1 | 12/2006 | Cohen | | WO | WO 00/15221 | 3/2000 |
| 2007/0003064 A1 | 1/2007 | Wiseman et al. | | WO | WO0011849 | 3/2000 |
| 2007/0016594 A1 | 1/2007 | Visharam et al. | | WO | WO 00/58811 | 10/2000 |
| 2007/0016784 A1 | 1/2007 | Vauclair | | WO | WO 00/59150 | 10/2000 |
| 2007/0067242 A1 | 3/2007 | Lotspiech et al. | | WO | WO 01/16900 | 3/2001 |
| 2007/0073747 A1 | 3/2007 | Jung et al. | | WO | WO 01/52021 | 7/2001 |
| 2007/0078898 A1 | 4/2007 | Hayashi et al. | | WO | WO0251096 A1 | 6/2002 |
| 2007/0088727 A1 | 4/2007 | Kindig | | WO | WO03028293 A1 | 4/2003 |
| 2007/0104105 A1 | 5/2007 | MeLampy et al. | | WO | WO 2004/006559 | 1/2004 |
| 2007/0106814 A1 | 5/2007 | Son et al. | | WO | 2004/014037 | 2/2004 |
| 2007/0143346 A1 | 6/2007 | Matsutani | | WO | WO2004023717 | 3/2004 |
| 2007/0171903 A1 | 7/2007 | Zeng et al. | | WO | 2004/030311 | 4/2004 |
| 2007/0185909 A1 | 8/2007 | Kelin et al. | | WO | WO2004030364 | 4/2004 |
| 2007/0220024 A1 | 9/2007 | Putterman et al. | | WO | WO2004097605 A1 | 11/2004 |
| 2007/0220048 A1 | 9/2007 | Ott | | WO | WO 2005/027404 | 3/2005 |
| 2007/0248073 A1 | 10/2007 | Pattavina et al. | | | | |
| 2007/0260615 A1 | 11/2007 | Shen | | | | |
| 2007/0274393 A1 | 11/2007 | Toma et al. | | | | |
| 2008/0046466 A1 | 2/2008 | Yun | | | | |
| 2008/0052751 A1 | 2/2008 | Cromarty et al. | | | | |
| 2008/0075168 A1 | 3/2008 | Toma et al. | | | | |
| 2008/0126812 A1 | 5/2008 | Ahmed et al. | | | | |
| 2008/0187284 A1 | 8/2008 | Ikeda et al. | | | | |
| 2008/0216116 A1 | 9/2008 | Pekonen et al. | | | | |
| 2009/0070438 A1 | 3/2009 | Bartholomew | | | | |
| 2009/0202079 A1 | 8/2009 | Puputti et al. | | | | |
| 2009/0216776 A1 | 8/2009 | Carol et al. | | | | |
| 2010/0138647 A1 | 6/2010 | Oliveira et al. | | | | |

FOREIGN PATENT DOCUMENTS

| | | |
|---|---|---|
| CN | 1643474 A | 7/2005 |
| EP | 0715246 | 6/1996 |
| EP | 0715247 | 6/1996 |
| EP | 1041823 | 10/2000 |
| EP | 1271830 A2 | 1/2003 |
| EP | 1298518 A2 | 4/2003 |
| EP | 1175750 | 10/2003 |
| EP | 1494425 | 1/2005 |
| JP | H-11-219329 | 8/1999 |

OTHER PUBLICATIONS

"RPT Payload Format for MPEG-4 Streams", Internet Engineering Task Force, Internet Draft, XP-001033580, Jul. 2001, 41 pages.

Curet, et al., "RTP Payload Format for MPEG-4 FexMultiplexed Streams", Internet Engineering Task Force, Internet Draft, XP-001075015, Nov. 8, 2001, 12 pages.

Handley, et al., "SDP: Session Description Protocol," The Internet Society, 1998, pp. 1-42.

Klemets, "RTP Payload Format for Video Codec 1 (VC-1)," Microsoft, Feb. 2006, pp. 1-36.

Mehaoua et al, "RTP4mux: A Novel MPEG-4 RTP Payload for Multicast Video Communications over Wireless IP", Retrieved from the Internet May 22, 2005: URL: http//www.polytech.uiv-nantes. PDF.

Proposed SMPTE Standard for Television: VC-1 Compressed Video Bitstream "Format and Decoding Process," The Society of Motion Picture and Television Engineers, Aug. 23, 2005, pp. 1-480.

"RTP Profile for Audio and Video Conferences with Minimal Control", RFC 1890, available at [[http://faqs.org/rfcs/rfc1890.html]], accessed Jan. 7, 2004, 14 pages.

Schulzrinne, et al., "RTP: A Transport Protocol for Real-Time Applications," The Internet Society, 2003, pp. 1-104.
Won-Ho Kim, "Design and Implementation of MPEG-2/DVB Scrambler Unit and VLSI Chip" 1997 International Conference on Consumer Electronics vol. 43 No. 3. pp. 320-321 Jun. 1997.
Official Notice of Rejection for Malaysian Patent Application No. PI 20042167 Mailed on Dec. 26, 2007, pp. 5.
Russian Decision on Grant for Russian Patent Application No. 2004120267 mailed on Apr. 15, 2009, 17 pgs.
Chinese First Office Action for Chinese Patent Application No. 200680029303.X mailed on Apr. 24, 2009, 10 pgs.
Nafaa, et al., "RTP4MUX: A Novel MPEG-4 RTP Payload for Multicast Video Communications over Wireless IP", IEEE-PV 2003, Apr. 28, 2003, 13th International Packet Video Workshop, availabe at <<http://www.prism.uvsq.fr/{anaf/nafaa_iscc03.pdf>>, 10 pages.
Hoffman, et al., "RTP Payload Format for MPEG1/MPEG2 Video", Network Working Group, RFC 2250, Jan. 1998, pp. 1-16.
Kim et al, "Design and Implementation of MPEG-2/DVB Scrambler Unit," International Conference on Consumer Electronics, vol. 43 No. 3., 1997, pp. 320-321.
"Media Distribution Technique," NTT R&D, vol. 52, No. 1, Jan. 10, 2003, 13 pages.
"Functional Model of a Conditional Access System"; EBU Review—Technical, European Broadcasting Union. Brussels, BE, No. 266; Dec. 21, 1995.
"Extended European Search Report"; Mailed Date Jul. 19, 2010; Application No. 06801132.9; Filed Date: Aug. 10, 2006; 9 pages.
Chinese First Office Action dated Aug. 7, 2009 for CN Application No. 200680029348.7 (14 pgs).
Chinese Second Office Action dated May 11, 2010 for CN Application No. 200680029348.7 (11 pgs).
Chinese Notice on Grant of Patent dated Oct. 13, 2010 for CN Application No. 200680029348.7 (4 pgs).
Russian Decision on Grant of Patent dated Feb. 3, 2011 for RU Application No. 2008104858 (5 pgs).
Australian First Office Action in Application 2004202538, mailed Oct. 29, 2008, 2 pgs.
Australian Notice of Allowance in Application 2004202538, mailed Nov. 24, 2009, 3 pgs.
Australian Notice of Allowance in Application 2005201577, mailed May 3, 2010, 3 pgs.
Australian Office Action in Application 2005201577, mailed Dec. 23, 2009, 2 pgs.
Australian Second Office Action in Application 2004202538, mailed Jul. 17, 2009, 2 pgs.
Canadian Office Action in Application 2469830, mailed Dec. 9, 2011, 2 pgs.
Chinese First Office Action in Application 200410063309.1, mailed Oct. 10, 2008, 11 pgs.
Chinese First Office Action in Application 200510067295, mailed Jul. 31, 2009, 9 pgs.
Chinese First Office Action in Application 200510071607X, mailed Oct. 24, 2008, 11 pgs.
Chinese First Office Action in Application 2006800244438, mailed Oct. 12, 2010, 7 pgs.
Chinese First Office Action in Application 2006800252913, mailed Mar. 8, 2010, 13 pgs.
Chinese First Office Action in Application 200680029303X, mailed Apr. 24, 2009, 10 pgs.
Chinese Notice of Allowance in Application 2006800252913, mailed Mar. 17, 2011, 4 pgs.
Chinese Notice of Allowance in Application 200410063309.1, mailed Dec. 3, 2010, 4 pgs.
Chinese Notice of Allowance in Application 200510067295, mailed Feb. 5, 2010, 4 pgs.
Chinese Notice of Allowance in Application 200680029303X, mailed Feb. 5, 2010, 4 pgs.
Chinese Second Office Action in Application 200410063309.1, mailed Apr. 28, 2010, 6 pgs.
Chinese Second Office Action in Application 200510071607X, mailed May 22, 2009, 6 pgs.
Chinese Second Office Action in Application 2006800244438, mailed Jan. 5, 2012, 6 pgs.

Chinese Second Office Action in Application 2006800252913, mailed Nov. 5, 2010, 9 pgs.
Chinese Second Office Action in Application 200680029303X, mailed Sep. 25, 2009, 8 pgs.
Comino, N. et al., "A Novel Data Distribution Technique for HostClient Type Parallel Applications", IEEE Transactions on Parallel and Distributed Systems, 2002, 13(2), p. 97-110.
European Office Action in EP Application 04102589.1, mailed Aug. 9, 2010, 9 pgs.
European Search Report in EP Application 04102589.1, mailed Nov. 8, 2004, 4 pgs.
Evans, P. "DRM: Is the Road to Adoption Fraught with Potholes?" Seybold Reporting Analyzing Publishing Technologies, 2001, 1(14), 32.
Fowler, T.B. "Technology's Changing Role in Intellectual Property Rights", IT Professional (IEEE), 2002, 4(2), 39-44.
Gable, J. "The Digital Rights Conundrum", *Transform Magazine*, 2001,10(11),27.
Griswold, G.N. "A Method for Protecting Copyright on Networks", IMA Intellectual Property Project Proceedings, 1994, 1(1), 169-178.
Gunter, C.A., et al. "Models and Languages for Digital Rights", Proceedings of the 34th Annual Hawaii International Conference on System Sciences, 2001,1-5.
Hong, S. et al., "On the construction of a powerful distributed authentication server without additional key management", Computer Communications, 2000, 23, 1638-1644.
Hwang, C. et al., "Protection of Digital Contents on Distributed Multimedia Environment", Proceedings of the IASTED International Conference, Internet and Multimedia Systems and Applications, Nov. 1923, 2000, Las Vegas, Nevada, USA, pp. 127-132.
Indonesian Notice of Allowance in Application P00200400282, mailed Nov. 2, 2009, 4 pgs.
Indonesian Office Action in Application P00200400282, mailed Apr. 29, 2009, 4 pgs.
Israel Office Action in Application 162304, mailed Oct. 19, 2009, 4 pgs.
Jakobsson, M. et al., "Proprietary Certificates", *Topics in Cryptology*, 2002, 164-181.
Japanese Notice of Allowance in Application 2005120933, mailed Jul. 26, 2011, 6 pgs.
Japanese Notice of Allowance in Application 2008521533, mailed Oct. 14, 2011, 6 pgs.
Japanese Notice of Allowance in JP Application 2004198165, mailed Apr. 20, 2010, 6 pgs.
Japanese Notice of Rejection in Application 2005120933, mailed Mar. 15, 2011, 7 pgs.
Japanese Notice of Rejection in Application 2008-520256, mailed Sep. 9, 2011, 4 pgs.
Japanese Notice of Rejection in Application 2008521533, mailed May 20, 2011, 4 pgs.
Japanese Notice of Rejection in JP Application 2004198165, mailed Jan. 5, 2010, 8 pgs.
Kahn, R.E. "Deposit, Registration and Recordation in an Electronic Copyright Management System", IMA Intellectual Property Project Proceedings, 1994, 1(1), 111-120.
Kim et al., "Protection Scheme for Secure MPEG-2 Streaming", 2004 IEEE International Conference on MultiMedia and Expo (ICME), vol. 2, Jun. 27-30, 2004, pp. 927-930.
Kumik, P. "Digital Rights Management", Computers and Law, 2000,11(4), 14-15.
Landfeldt, "A Method and System for Consolidating Multimedia Object Management in Heterogenous Media Systems", NSW 2006, Univ. of Sydney, 5 pgs., http://www.cs.usyd.edu.au/~bjornl/research/papers/Sympotic04.pdf.
Malaysian First Office Action in Application PI20042167, mailed Nov. 13, 2007, 3 pgs.
Malaysian Notice of Allowance in Application PI20042167, mailed Oct. 31, 2011, 2 pgs.
Malaysian Second Office Action in Application PI20042167, mailed Oct. 30, 2009, 2 pgs.
Malaysian Third Office Action in Application PI20042167, mailed May 31, 2010, 2 pgs.

Managing Digital Rights in Online Publishing, "How two publishing houses maintain control of copyright" Information Management &Technology, 2001, 34(4), 168-169.
MusicMatch, MusicMatch Jukebox Use's Guide, Feb. 7, 2003. Chapters AI-A6 and 1-9.
New Zealand Advisory Action in Application 543135, mailed Jan. 8, 2007, 2 pgs.
New Zealand Examination Report in Application 543135, mailed Oct. 27, 2005, 2 pgs.
Park et al., "Contents Distribution System Based on MPEG-4 ISMA Cryp in IP Set-top Box Environments", IEEE Transactions on Consumer Electronics, vol. 52, Issue 2, May 2006, pp. 660-668.
PCT International Search Report and Written Opinion in Application PCT/US06/24293, mailed Jun. 17, 2008, 8 pgs.
PCT International Search Report and Written Opinion in Application PCT/US06/26913, mailed Sep. 18, 2007, 5 pgs.
PCT International Search Report and Written Opinion in Application PCT/US2006/031557, mailed Jan. 9, 2007, 7 pgs.
Peinado, M. "Digital rights management in a multimedia environment", SMPTE Journal, 2002, 111(3), 159-163.
Royan, B. Content creation and rights management; experiences of SCRAN (the Scottish Cultural Resources Access Network), Program, 34(2), 131-142.
Russian First Office Action in Application 2004120267, mailed Oct. 28, 2008, 18 pgs.
Russian Notice of Allowance in Application 2008101456, mailed Oct. 6, 2010, 6 pgs.
Russian Notice of Allowance in Application 2004120267, mailed Apr. 20, 2009, 17 pgs.
Russian Notice of Allowance in Application 2005111507, mailed May 27, 2009, 8 pgs.
Russian Office Action in Application 2005111507, mailed Mar. 19, 2009, 1 pg.
Sastry et al., "Webtour: A System to Record and Playback Dynamic Multimedia Annotations on Web Document Content," 1999, pp. 175-178, http://delivery.acm.org/10.1145/320000/319925/p175sastry.pdf?key1=319925&key2=9561680411&coll=GUIDE&dI=GUIDE&CFID=69725778&CFTOKEN=94959612.
Schulzrinne et al., "RTP: A Transport Protocol for Real-Time Applications," Jan. 1996, IETF.org, pp. 1-75.
Senoh et al., "DRM Renewability & Interoperability", Consumer Communications and Networking Conference, 2004, CCNC 2204, First IEEE Jan. 5-8, 2004, pp. 424-429.
Taiwan Notice of Allowance in Application 93115873, Apr. 19, 2011, 4 pgs.
Taiwan Search Report from First Office Action in Application 93115873, mailed Nov. 30, 2010, 1 pg.
Torrubia, A. et al., "Cryptography regulations for E-commerce and digital rights management", Computers & Security, 2001, 20(8), 724-738.
U.S. Appl. No. 10/612,851, Advisory Action mailed Aug. 15, 2008, 3 pgs.
U.S. Appl. No. 10/612,851, Amendment and Response filed Feb. 14, 2008, 28 pgs.
U.S. Appl. No. 10/612,851, Amendment and Response filed Aug. 7, 2008, 30 pgs.
U.S. Appl. No. 10/612,851, Amendment and Response filed Sep. 8, 2008, 31 pgs.
U.S. Appl. No. 10/612,851, Notice of Allowance mailed Oct. 2, 2008, 5 pgs.
U.S. Appl. No. 10/612,851, Office Action mailed Apr. 7, 2008, 12 pgs.
U.S. Appl. No. 10/612,851, Office Action mailed Sep. 14, 2007, 10 pgs.
U.S. Appl. No. 10/811,030, Advisory Action mailed May 19, 2008, 3 pgs.
U.S. Appl. No. 10/811,030, Amendment and Response filed Dec. 13, 2007, 22 pgs.
U.S. Appl. No. 10/811,030, Amendment and Response filed Dec. 18, 2008, 22 pgs.
U.S. Appl. No. 10/811,030, Amendment and Response filed May 9, 2008, 22 pgs.
U.S. Appl. No. 10/811,030, Office Action mailed Jan. 9, 2008, 11 pgs.
U.S. Appl. No. 10/811,030, Office Action mailed Feb. 9, 2009, 12 pgs.
U.S. Appl. No. 10/811,030, Office Action mailed Sep. 11, 2007, 17 pgs.
U.S. Appl. No. 10/811,030, Office Action mailed Sep. 18, 2008, 10 pgs.
U.S. Appl. No. 10/827,167, Advisory Action mailed Jan. 31, 2008, 3 pgs.
U.S. Appl. No. 10/827,167, Amendment and Response filed Jan. 17, 2008, 13 pgs.
U.S. Appl. No. 10/827,167, Amendment and Response filed Oct. 2, 2007, 12 pgs.
U.S. Appl. No. 10/827,167, Notice of Allowance mailed Aug. 8, 2008, 9 pgs.
U.S. Appl. No. 10/827,167, Office Action mailed Dec. 11, 2007, 22 pgs.
U.S. Appl. No. 10/827,167, Office Action mailed Jul. 2, 2007, 21 pgs.
U.S. Appl. No. 11/139,956, Amendment and Response filed Jan. 12, 2010, 5 pgs.
U.S. Appl. No. 11/139,956, Notice of Allowance mailed Oct. 13, 2009, 8 pgs.
U.S. Appl. No. 11/139,956, USPTO Response mailed Feb. 25, 2010, 2 pgs.
U.S. Appl. No. 11/176,058, Amendment and Response filed Jan. 23, 2009, 22 pgs.
U.S. Appl. No. 11/176,058, Amendment and Response filed Nov. 1, 2007, 13 pgs.
U.S. Appl. No. 11/176,058, Amendment and Response filed May 1, 2009, 17 pgs.
U.S. Appl. No. 11/176,058, Amendment and Response filed Jun. 25, 2008, 16 pgs.
U.S. Appl. No. 11/176,058, Amendment and Response filed Sep. 29, 2009, 18 pgs.
U.S. Appl. No. 11/176,058, Notice of Allowance mailed Jan. 13, 2010, 14 pgs.
U.S. Appl. No. 11/176,058, Notice of Allowance mailed Mar. 22, 2010, 8 pgs.
U.S. Appl. No. 11/176,058, Office Action mailed Jan. 25, 2008, 10 pgs.
U.S. Appl. No. 11/176,058, Office Action mailed Oct. 27, 2008, 9 pgs.
U.S. Appl. No. 11/176,058, Office Action mailed Apr. 2, 2009, 10 pgs.
U.S. Appl. No. 11/176,058, Office Action mailed Jul. 2, 2007, 10 pgs.
U.S. Appl. No. 11/176,058, Office Action mailed Aug. 5, 2009, 11 pgs.
U.S. Appl. No. 11/179,206, Amendment and Response filed Jan. 9, 2008, 16 pgs.
U.S. Appl. No. 11/179,206, Amendment and Response filed Oct. 15, 2008, 14 pgs.
U.S. Appl. No. 11/179,206, Amendment and Response filed Mar. 31, 2009, 16 pgs.
U.S. Appl. No. 11/179,206, Notice of Allowance mailed May 14, 2009, 6 pgs.
U.S. Appl. No. 11/179,206, Office Action mailed Oct. 31, 2008, 8 pgs.
U.S. Appl. No. 11/179,206, Office Action mailed Apr. 16, 2008, 7 pgs.
U.S. Appl. No. 11/179,206, Office Action mailed Aug. 9, 2007, 7 pgs.
U.S. Appl. No. 11/202,430, Amendment and Response filed Oct. 7, 2009, 8 pgs.
U.S. Appl. No. 11/202,430, Amendment and Response filed Mar. 20, 2009, 17 pgs.
U.S. Appl. No. 11/202,430, Notice of Allowance mailed Oct. 1, 2009, 5 pgs.
U.S. Appl. No. 11/202,430, Office Action mailed Feb. 11, 2009, 12 pgs.
U.S. Appl. No. 11/202,430, USPTO Response filed Oct. 23, 2009, 2 pgs.
U.S. Appl. No. 11/389,992, Advisory Action mailed Dec. 15, 2008, 3 pgs.
U.S. Appl. No. 11/389,992, Amendment and Response filed Jan. 22, 2010, 13 pgs.

U.S. Appl. No. 11/389,992, Amendment and Response filed Dec. 3, 2008, 12 pgs.
U.S. Appl. No. 11/389,992, Amendment and Response filed Apr. 29, 2010, 17 pgs.
U.S. Appl. No. 11/389,992, Amendment and Response filed May 8, 2008, 13 pgs.
U.S. Appl. No. 11/389,992, Amendment and Response filed Jul. 1, 2009, 19 pgs.
U.S. Appl. No. 11/389,992, Notice of Allowance mailed Jul. 8, 2010, 15 pgs.
U.S. Appl. No. 11/389,992, Office Action mailed Nov. 10, 2009, 17 pgs.
U.S. Appl. No. 11/389,992, Office Action mailed Feb. 2, 2010, 19 pgs.
U.S. Appl. No. 11/389,992, Office Action mailed Mar. 6, 2008, 13 pgs.
U.S. Appl. No. 11/389,992, Office Action mailed Apr. 1, 2009, 18 pgs.
U.S. Appl. No. 11/389,992, Office Action mailed Sep. 3, 2008, 14 pgs.
U.S. Appl. No. 12/360,099, Amendment and Response filed Jul. 30, 2010, 12 pgs.
U.S. Appl. No. 12/360,099, Notice of Allowance mailed Sep. 29, 2010, 8 pgs.
U.S. Appl. No. 12/360,099, Office Action mailed May 26, 2010, 16 pgs.
U.S. Appl. No. 12/702,148, Office Action mailed Dec. 7, 2011, 12 pgs.
Valimaki, M. et al., "Digital rights management on open and semi-open networks", WIAPP, 2001, 154-155.
Van Der Meer, "Network Working Group", retrieved Apr. 9, 2008 at http://www.networksorcery.com/enp/rfc/rfc3640.txt, The Internet Society, Nov. 2003, pp. 1-55.
Xin et al., "Bit Allocation for Joint Transcoding of Multiple MPEG Coded Video Streams," 22001 IEEE International Conference on Multimedia and Expo, pp. 9-12, http://ieeexplore.ieee.org/iel5/8766/27769/01237642.pdf?isNumber=.
Yu, H. "Digital multimedia at home and content rights management", IEEE, Proceedings 2002 IEEE 4th International Workshop on Networked Appliances, 2002, 49-56.
Zwollo, K. "Digital document delivery and digital rights management", Information Services & Use, 2001, 9-11.
"Aladdin Knowledge Systems Partners with Rights Exchange, Inc. to Develop a Comprehensive Solution for Electronic Software Distribution", Aug. 3, 1988, 5 pgs.
"Rights Management in the Digital Age: Trading Bits, Not Atoms", Spring 1997, 4, 3 pgs.
Aladdin acquires the assets of Micro Macro Technologies, Business Wire, 1999, 2 pgs.,http://www.findarticies.com.
Armati, D., "Tools and standards for protection, control and presentation of data," Apr. 3, 1996, 17 pages.
Australian Notice of Acceptance in Application 2006240480, mailed Oct. 20, 2010, 2 pgs.
Australian Office Action in Application 2006240480, mailed Aug. 9, 2010, 2 pgs.
Australian Office Action in Application 2006240484, mailed Nov. 24, 2009, 2 pgs.
Benjamin, R. et al., "Electronic markets and virtual value chains on the information superhighway," Sloan Management Rev. Winter, 1995, 62-72.
Cassidy, "A Web developers guide to content encapsulation technology," Apr., 1997, 5 pages.
Chilean Second Office Action in Application 15492004, mailed Jun. 18, 2008, 5 pgs.
Chilean Third Office Action in Application 15492004, mailed Jun. 18, 2009, 6 pgs.
Chinese Notice of Allowance in Application 200680013363.2, mailed Aug. 2, 2011, 4 pgs.
Chinese Office Action in application 200680012903.5, mailed Jun. 24, 2011, 6 pgs.
Chinese Office Action in Application 200680013363.2, mailed Sep. 14, 2010, 11 pgs.
Cox, B., "Superdistribution," Idees Fortes. Sep. 1994, 2 pages.

Cox, B., "What if There Is a Silver Bullet," J Object Oriented Programm.• Jun. 1992, 8-9 and 76.
From http://www.findarticles.com. "BreakerTech joins copyright management market," Computer International, 1999.
From PR Newswire, "Sony develops copyright protection solutions for digital music content," 1999, http://www.findarticles.com.
Hauser, R.C., "Does licensing require new access control techniques?" Aug. 1993, 9 pages.
Hudgins-Bonafield, C. "Selling Knowledge on the Net," Network Computing. Jun. 1, 1995, 102-109.
IBM spearheading intellectual property protection technology for information on the Internet, May 1996, 3 pages.
Kaplan, M.A., "IBM Cryptolopes, Super-Distribution and Digital Rights Management", Dec. 1996, 10 pgs.
Kay, Russell, Memory Leaks and Garbage Collection, Aug. 7, 2000, Computerworld, vol. 34, Issue 32.
Kent, S.T., "Protecting externally supplied software in small computers," Sep. 1980, 1-42 and 250-252.
Kohl, U. et al., "Safeguarding Digital Library Contents and Users; Protecting Documents Rather Than Channels," D-Lib Magazine. Sep. 1997, 9 pages.
Licenslt: kinder, gentler copyright? Copyright management system links content, authorship information, Seybold Report on Desktop Publishing. 1996, 10(11), 2 pages.
Linn, R.J., "Copyright and Information Services in the Context of the National Research and Education Network," IMA Intel!. Property Project Proceedings. Jan. 1994, 1(1), 1 and 10-20.
McNab, L., "Super-Distribution works better in practical applications", Mar. 2, 1998, 2 pgs.
Moeller, M., "IBM takes charge of E-commerce; Plans client, server apps based on SET," Apr. 1996, 4 pages.
Moeller, M., "NetTrust lets cyberspace merchants take account", PC Week, Nov. 20, 1995, 12(48), 1 page.
Olson, M., et al., "Concurrent access licensing," UNIXReview. 1988, 6(9), 67-72 (from Dialog Accession No. 01254918).
Parkin, Ric, Garbage Collection and Object Lifetime, Oct. 2004, Overload, Issue 63.
PCT International Search Report and Written Opinion in application PCT/US06/09650, mailed May 21, 2008, 12 pgs.
PCT International Search Report and Written Opinion in Application PCT/US2006/09900, mailed Jan. 22, 2008, 9 pgs.
PCT International Search Report and Written Opinion in Application PCT/US2006/09906, mailed Nov. 20, 2007, 8 pgs.
Pemberton, J., "An Online Interview with Jeff Crigler at IBM InfoMarket," Jul. 1996, 6 pages.
Rarnanujapuram, A. et al., "Digital Content & Intellectual Property Rights: A specification language and tools for rights management," Dec. 20-23 and 26, 1998.
Schneier, Bruce, "Applied Cryptography, Protocols, Algorithms and Source Code in C", 2nd edition, 1996 ISBN: 0471128457), p. 180.
Sibert, O. et al., "Securing the Content, Not the Wire, for Information Commerce," Jul. 1995, 12 pgs.
Sibert, O. et al., "The DigiBox: A Self-protecting Container for Information Commerce," First USENIX Workshop on Electronic Commerce. Jul. 11-12, 1995, 171-183.
Singapore Written Opinion in Application 200706495-9, mailed Dec. 31, 2008, 11 pgs.
Stefik, M., "Shifting the Possible: How Trusted Systems and Digital Property Rights Challenge Us to Rethink Digital Publishing," Technical Perspective. 1997, 137-159.
Stefik, M., "Trusted Systems," Mar. 1997, 8 pages.
Technological Solutions Rise to Complement Law's Small Stick Guarding Electronic Works, Information Law Alert. Jun. 16, 1995, 3-4 and 7.
Thompson, C. W. et al., "Digital Licensing", IEEE Internet Computing, 2005, 9(4).
Thorsberg, Frank et al., New Shackles on your CD, video copying, Jan. 2002, PC World, vol. 20, Iss 1, 4 pgs.
Unknown, "Black box crypton defies the hackers," Electronic Weekly, 1985, 1257, p. 26 (from DialogClassic Web™ file 27 5, Accession No. 01116377).
Unknown, "Solution for piracy," Which Computer, 1983, p. 29 (from DialogClassic Web™ file 275, Accession No. 01014280).

Unknown, Finland-Data fellows secures ICSA certification, Newsbytes, 1998, (from DialogClassic Web(TM), File 9, Accession No. 01451058, 2 pages).

Unknown, Optimising license checkouts from a floating license server, ARM the Architecture for the Digital World. http://www.arm.com/supportlfaqdev/1391.html.

U.S. Appl. No. 11/112,325, Amendment and Response filed Jul. 6, 2009, 14 pgs.

U.S. Appl. No. 11/112,325, Notice of Allowance mailed Nov. 16, 2009, 6 pgs.

U.S. Appl. No. 11/112,325, Office Action mailed Apr. 14, 2009, 17 pgs.

U.S. Appl. No. 11/113,160, Amendment and Response filed Nov. 3, 2010, 12 pgs.

U.S. Appl. No. 11/113,160, Amendment and Response filed Dec. 17, 2009, 8 pgs.

U.S. Appl. No. 11/113,160, Amendment and Response filed Jun. 1, 2009, 12 pgs.

U.S. Appl. No. 11/113,160, Amendment and Response filed Jun. 9, 2010, 9 pgs.

U.S. Appl. No. 11/113,160, Amendment and Response filed Aug. 11, 2008, 10 pgs.

U.S. Appl. No. 11/113,160, Office Action mailed Dec. 1, 2008, 11 pgs.

U.S. Appl. No. 11/113,160, Office Action mailed Mar. 26, 2010, 10 pgs.

U.S. Appl. No. 11/113,160, Office Action mailed Sep. 1, 2010, 13 pgs.

U.S. Appl. No. 11/113,160, Office Action mailed Apr. 29, 2008, 10 pgs.

U.S. Appl. No. 11/113,160, Office Action mailed Sep. 17, 2009, 8 pgs.

U.S. Appl. No. 11/113,215, Advisory Action mailed Oct. 3, 2006, 4 pgs.

U.S. Appl. No. 11/113,215, Advisory Action mailed Feb. 2, 2009, 2 pgs.

U.S. Appl. No. 11/113,215, Amendent and Response filed Jan. 7, 2009, 11 pgs.

U.S. Appl. No. 11/113,215, Amendent and Response filed Oct. 29, 2007, 14 pgs.

U.S. Appl. No. 11/113,215, Amendent and Response filed Apr. 11, 2006, 16 pgs.

U.S. Appl. No. 11/113,215, Amendent and Response filed Apr. 25, 2008, 12 pgs.

U.S. Appl. No. 11/113,215, Amendent and Response filed Apr. 7, 2009, 11 pgs.

U.S. Appl. No. 11/113,215, Amendent and Response filed May 29, 2007, 13 pgs.

U.S. Appl. No. 11/113,215, Amendent and Response filed Sep. 14, 2006, 13 pgs.

U.S. Appl. No. 11/113,215, Office Action mailed Jan. 28, 2008, 7 pgs.

U.S. Appl. No. 11/113,215, Office Action mailed Oct. 7, 2008, 11 pgs.

U.S. Appl. No. 11/113,215, Office Action mailed Feb. 27, 2006, 5 pgs.

U.S. Appl. No. 11/113,215, Office Action mailed Feb. 28, 2007, 9 pgs.

U.S. Appl. No. 11/113,215, Office Action mailed Jun. 17, 2009, 11 pgs.

U.S. Appl. No. 11/113,215, Office Action mailed Jul. 28, 2006, 6 pgs.

U.S. Appl. No. 11/113,215, Office Action mailed Aug. 15, 2007, 9 pgs.

U.S. Appl. No. 11/113,216, Amendment and Response filed Dec. 23, 2009, 13 pgs.

U.S. Appl. No. 11/113,216, Amendment and Response filed Dec. 5, 2011, 9 pgs.

U.S. Appl. No. 11/113,216, Amendment and Response filed Apr. 28, 2009, 15 pgs.

U.S. Appl. No. 11/113,216, Amendment and Response filed Apr. 8, 2011, 13 pgs.

U.S. Appl. No. 11/113,216, Office Action mailed Jan. 28, 2009, 10 pgs.

U.S. Appl. No. 11/113,216, Office Action mailed Dec. 30, 2010, 13 pgs.

U.S. Appl. No. 11/113,216, Office Action mailed Feb. 17, 2012, 14 pgs.

U.S. Appl. No. 11/113,216, Office Action mailed Sep. 1, 2009, 12 pgs.

U.S. Appl. No. 11/113,216, Office Action mailed Sep. 7, 2011, 13 pgs.

U.S. Appl. No. 11/139,951, Advisory Action mailed Apr. 22, 2008, 3 pgs.

U.S. Appl. No. 11/139,951, Amendment and Response filed Oct. 25, 2007, 13 pgs.

U.S. Appl. No. 11/139,951, Amendment and Response filed Dec. 17, 2008, 11 pgs.

U.S. Appl. No. 11/139,951, Amendment and Response filed Apr. 8, 2008, 11 pgs.

U.S. Appl. No. 11/139,951, Amendment and Response filed May 12, 2009, 7 pgs.

U.S. Appl. No. 11/139,951, Notice of Allowance mailed Apr. 3, 2009, 5 pgs.

U.S. Appl. No. 11/139,951, Office Action mailed Jan. 9, 2008, 14 pgs.

U.S. Appl. No. 11/139,951, Office Action mailed Jul. 27, 2007, 13 pgs.

U.S. Appl. No. 11/139,951, Office Action mailed Sep. 18, 2008, 10 pgs.

U.S. Appl. No. 12/702,148, Amendment and Response filed Mar. 5, 2012, 14 pgs.

U.S. Appl. No. 12/702,148, Notice of Allowance mailed Apr. 12, 2012, 8 pgs.

Weber, R., "Digital Right Management Technology", Oct. 1995, 55 pgs.

White, Ron, "How Computers Work," millennium ed., Que Corporation, Sep. 1999, 44 pgs.

White, S.R. et al., "Abyss: A trusted architecture for software protection," IEEE Symposium on Security and Privacy. Apr. 27-29, 1987, 38-51.

White, S.R. et al., "ABYSS: An Architecture for Software Protection," IEEE Trans. On Software Engineering. Jun. 1990, 16(6), 619-629.

Canadian Office Action in Application 2469830, mailed Mar. 28, 2012, 2 pgs.

Chinese Notice on the First Office Action mailed Mar. 21, 2012, in Application No. 200680010120 (6 pages).

European Search Report in EP Application 05102770.4, mailed Apr. 4, 2012, 5 pgs.

Freier, Alan et al. "The SSL Protocol Version 3.0," draft-ietf-tls-ssl-version3-00.tzt, vol. tls, Nov. 18, 1996 (66 pages).

Rescorla, E. et al. "Guidelines for Writing RCE Text on Security Consideration," draft-rescorla-sec-cons-03.txt, No. 3, Mar. 1, 2001 (28 pages).

U.S. Appl. No. 11/113,216, Amendment and Response filed Apr. 27, 2012, 9 pgs.

U.S. Appl. No. 12/702,148, Notice of Allowance mailed May 1, 2012, 8 pgs.

Japanese Notice of Allowance mailed Jun. 1, 2012, in Application No. 2008-520256 (6 pages).

Chinese Third Office Action in Application 2006800244438, mailed Aug. 3, 2012, 10 pgs.

Taiwan Search Report dated Aug. 3, 2012, in Application No. 095107801 (1 page).

Korean Preliminary Rejection mailed Aug. 14, 2012, in Applicaton No. 10-2007-7024113 (1 page).

U.S. Appl. No. 12/702,148, Notice of Allowance mailed Jul. 17, 2012 (8 pgs).

U.S. Appl. No. 11/113,216, Non-Final Office Action mailed Aug. 16, 2012 (13 pgs).

U.S. Appl. No. 11/113,160, Notice of Allowance mailed Jul. 23, 2012 (9 pgs).

* cited by examiner

PROTECTING DIGITAL MEDIA OF VARIOUS CONTENT TYPES

BACKGROUND

Digital Rights Management (DRM) refers to techniques that are used to protect content, such as by controlling or restricting the use of digital media content on electronic devices. One characteristic of DRM is that it can bind the media content to a given machine or device. Thus, a license that pertains to a particular piece of content and that defines rights and restrictions associated with the piece of content will typically be bound to the given machine or device. As a result, a user may not take the piece of content and move it to another machine in order to playback the content.

Current DRM techniques have limitations. They are often compatible with only two types of protocols for transferring digital media—HTTP and RTSP. But other protocols may now or in the future be better suited for transferring digital media. Also, content protected by DRM may be limited to a particular content type. One particular content type—ASF files—permits only one set of rights and restrictions, i.e. "policies", to apply to an entire ASF file. For example, when a video file is rendered, either Macrovision may be required to be enabled on an analog video output for the whole file, or it may not be required at all.

SUMMARY

Systems and/or methods ("tools") are described that enable a digital rights management policy to be associated with digital media having an arbitrary content type or transfer control protocol. In some embodiments, the tools encrypt data segments of a media file and add a descriptor to each of those segments. These descriptors can enable a receiver of the encrypted media file to decrypt the file and consume it according to the correct digital rights management policy.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

Overview

Figure 1:
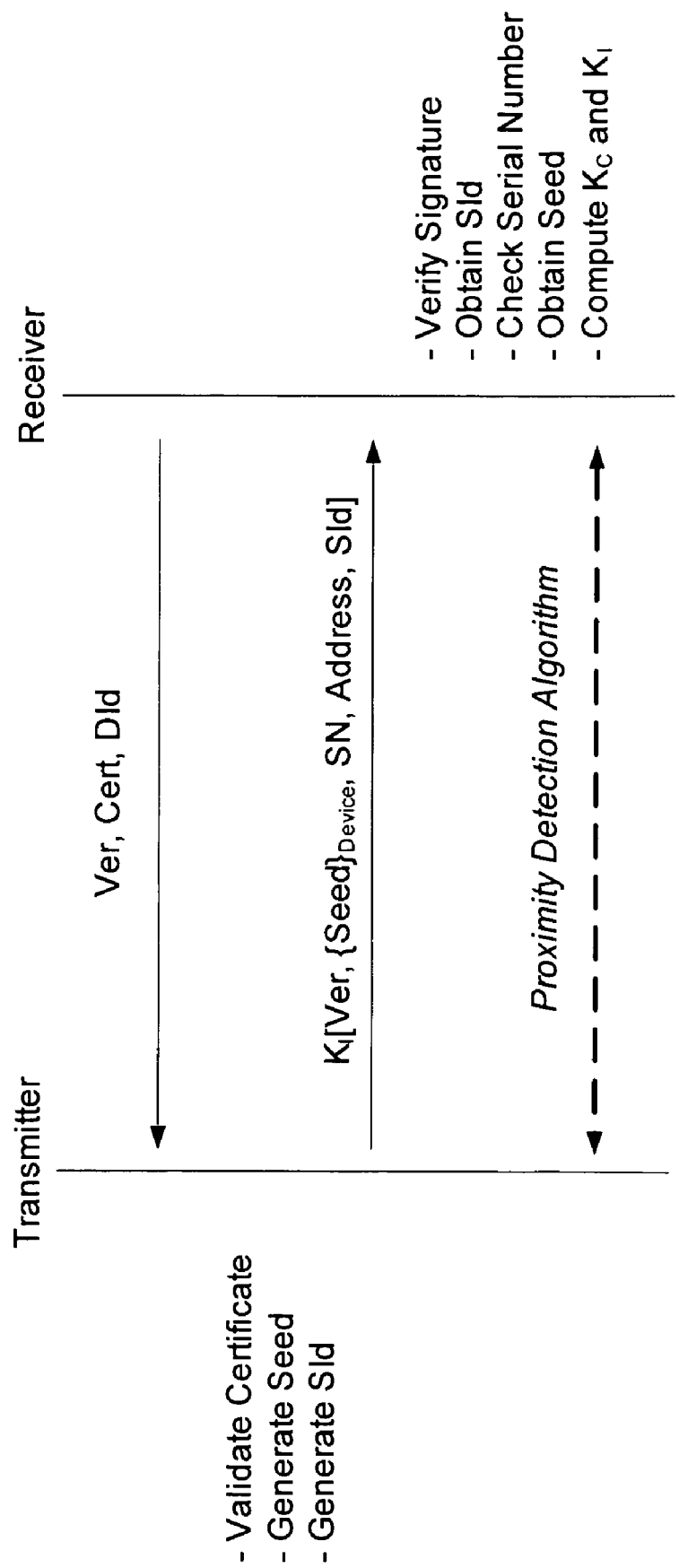
FIG. 1 illustrates an exemplary registration procedure of a protocol with which the inventive embodiments can be employed in one embodiment.

Tools are described that enable a digital rights management policy to be associated with digital media having an arbitrary content type or transfer control protocol. In some embodiments, the tools encrypt data segments of a media file and add a descriptor to each of those segments. These descriptors can enable a receiver of the encrypted media file to decrypt the file and consume it according to the correct digital rights management policy.

In the discussion that follows, a section entitled "Content Security and License Transfer Protocol" is provided and describes one particular system in which the inventive techniques can be employed. Following this, sections entitled "RTSP" and "HTTP" are provided to give the reader who is unfamiliar with these protocols understanding of the inventive techniques in these spaces.

Following this section, a section entitled "Root and Leaf Licenses" is provided and describes the notion of an initial, root license enabling multiple other licenses for a media file. Following this section, a section entitled "A Single, Encrypted Media File with Multiple Leaf Licenses" is provided and describes how a media file can be associated with more than one digital rights management policy using leaf licenses associated with portions of the media file.

Following these sections, two sections, the first entitled "Descriptors" and the second entitled "Content-Independent Data Encryption" describe descriptors for data segments of a media file and manners in which the tools may use these descriptors to enable encryption of a media file regardless of its type of digital content. The last section, "Using Root and Leaf Licenses" describes one way in which the tools may use root and leaf licenses.

Content Security and License Transfer Protocol

The following provides a discussion of an exemplary protocol that provides security and transfers licenses for content flowing over digital links. This protocol constitutes but one exemplary protocol with which the various inventive techniques can be employed. It is to be appreciated and understood that other protocols can be utilized without departing from the spirit and scope of the claimed subject matter.

The following cryptographic notation is used in this description:

K{data} data is encrypted with secret key K.
K[data] data is signed with secret key K.
{data}$_{Device}$ data is encrypted with the device's public key.
[data]$_{Device}$ data is signed with the device's private key.

In this particular protocol, there are five primary procedures: Registration, Revalidation, Proximity Detection, Session Establishment, and Data Transfer.

In the Registration procedure, a transmitter (i.e. a device that has content that is to be transmitted to another device) can uniquely and securely identify an intended receiver (i.e. a device to which content is to be transmitted). In this particular protocol, the transmitter maintains a database with registered receivers and ensures that no more than a small predetermined number of receivers are used simultaneously. During the registration process, the transmitter also employs a Proximity Detection procedure to ensure that the receiver is located "near" the transmitter in the network, in order to prevent wide distribution of protected content.

The Revalidation procedure is utilized to ensure that the receiver continues to be "near" the transmitter. Content is not delivered to receivers unless they have been registered or revalidated within a predetermined period of time in the past.

The Session Establishment procedure is used whenever the receiver requests content from the transmitter. The transmitter enforces that devices must be registered and recently validated before the Session Establishment can be completed.

Once the session is established, the Data Transfer of the requested content can take place in a secure way. The receiver may reuse the session to retrieve specific portions of the content (seeking), but must establish a new session in order to retrieve a different content.

Consider now the Registration procedure in connection with FIG. 1 and the table just below that describes the various messages that are passed between the transmitter and the receiver during registration.

the form indicated above to the receiver in a registration response message. The receiver then validates the transmitter's signature, obtains the session ID and performs the other actions indicated in the figure. The receiver and the transmitter can then undergo a proximity detection process which is described below.

With regard to Revalidation, the same procedures as outlined above are performed, with the difference being that during Revalidation, the receiver is already registered in the database.

Figure 2:
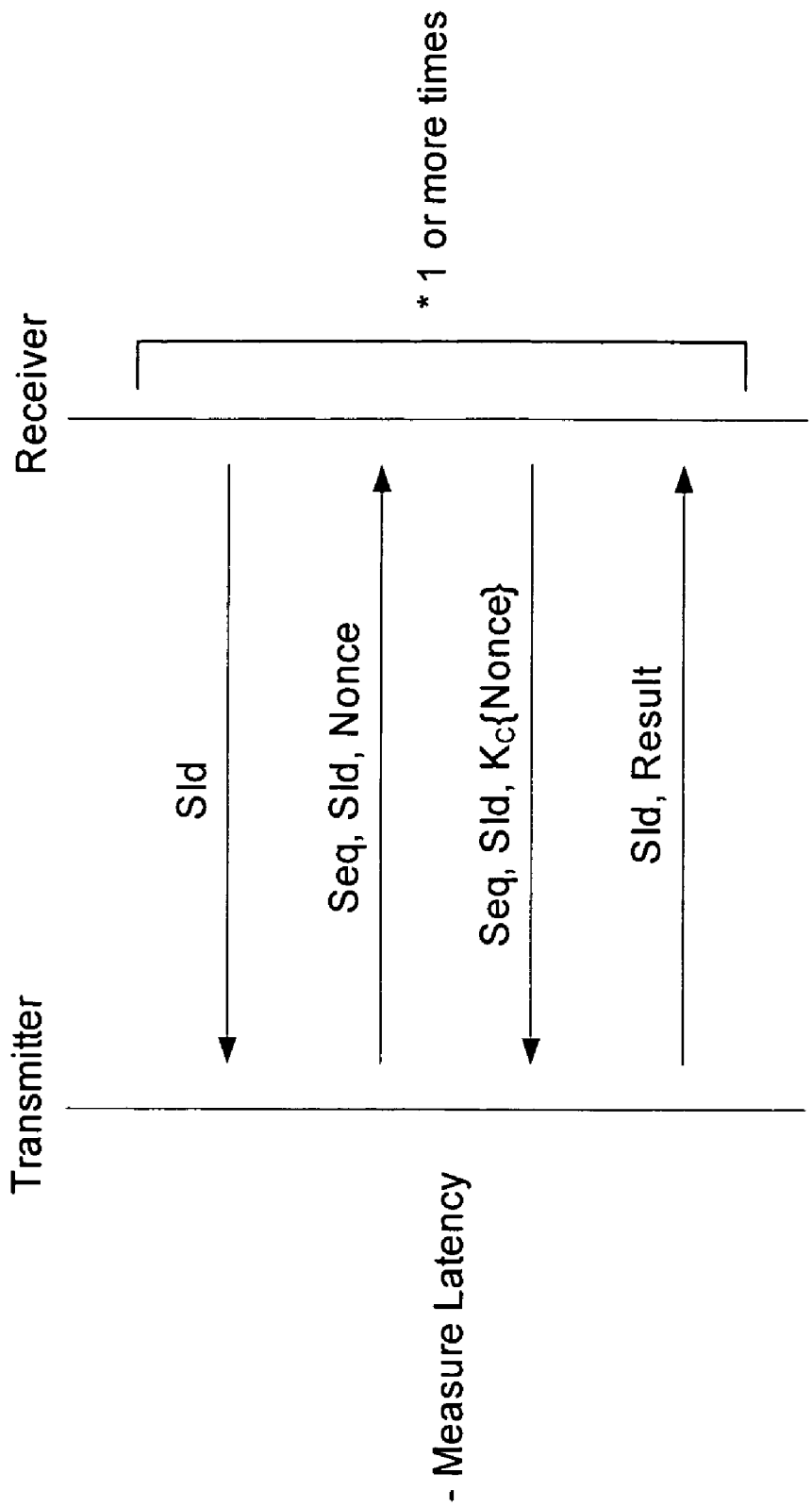
FIG. 2 illustrates an exemplary proximity detection procedure of a protocol with which the inventive embodiments can be employed in one embodiment.

With regard to Proximity Detection, consider the following in connection with FIG. 2.

During the Proximity Detection procedure, the receiver sends to the transmitter a message containing the Session Id indicated in a Proximity Detection Initialization Message. The transmitter then sends to the receiver a message containing a Nonce (128-bit random value), and measures the time it takes for the receiver to reply with the nonce encrypted using a Content Encryption key. Finally, the transmitter sends a message to the receiver indicating if the proximity detection was successful or not.

The receiver may repeat the process until it has a confirmation that the proximity detection succeeded. When this particular protocol is used over IP-based networks, the proximity detection messages are exchanged over UDP. The receiver learns the transmitter's address via the Registration Response message. The receiver's address does not need to be

| Message | Value | Description |
| --- | --- | --- |
| Registration Request Message | Ver | 8-bit Protocol Version |
| | Cert | XML digital certificate of the Receiver. |
| | DId | 128-bit Serial Number. |
| Registration Response Message | Ver | 8-bit Protocol Version |
| | { Seed }Device | 128-bit Seed used to derive the Content Encryption key and Content Integrity key. |
| | SN | 128-bit Serial Number. |
| | Address | Address of transmitter's incoming and outgoing proximity packets socket. |
| | SId | 128-bit Random Session Id. |
| Proximity Detection Algorithm | | The Proximity Detection Algorithm is executed out-of-band. |

Here, the receiver sends a registration request message that contains, among other information, the receiver's digital certificate. Responsive to receiving the registration request message, the transmitter validates the receiver's certificate, generates a seed and a random session ID, returning the same in separately communicated since it can be determined by inspecting the incoming IP header of the UDP packet that carries the Proximity Detection Initialization Message.

The following table describes the messages that are exchanged during Proximity Detection:

| Message | Value | Description |
| --- | --- | --- |
| Proximity Start Message | SId | Same 128-bit Session Id value sent by the transmitter. |
| Proximity Challenge Message | Seq | 8-bit incremental sequence number. |
| | SId | Same 128-bit Session Id. |
| | Nonce | 128-bit Random Value. |
| Proximity Response Message | Seq | Same sequence number determined by the transmitter. |
| | SId | Same 128-bit Session Id. |
| | KC{Nonce} | 128-bit Nonce encrypted using the Content Encryption key. |
| Proximity Result Message | SId | Same 128-bit Session Id. |
| | Result | Status code indicating the success or failure of the registration procedure. |

Figure 3:
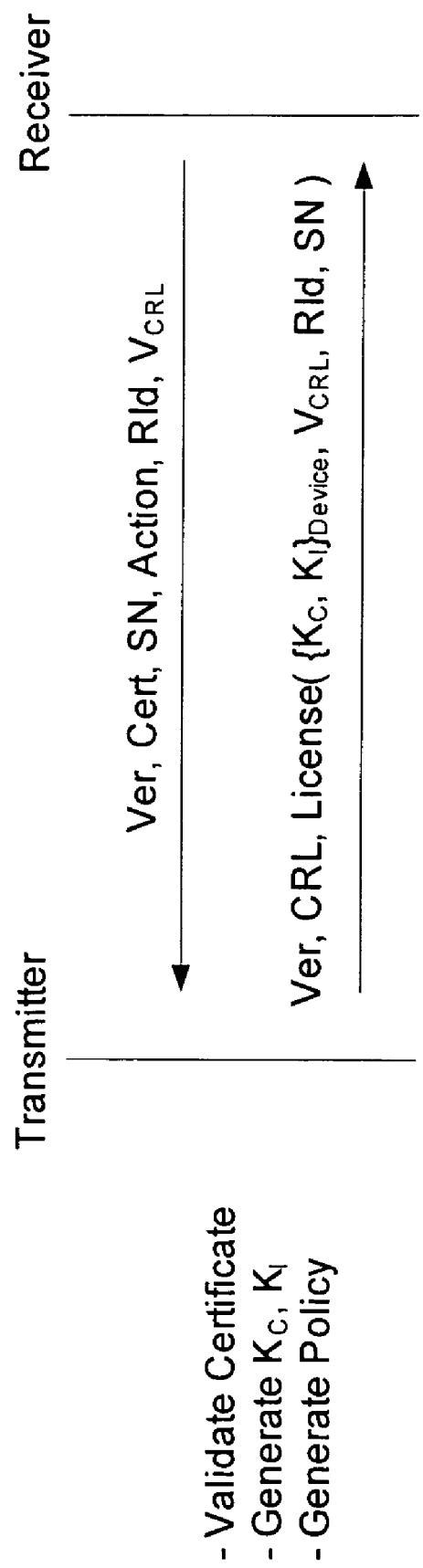
FIG. 3 illustrates an exemplary session establishment procedure of a protocol with which the inventive embodiments can be employed in one embodiment.

With regard to Session Establishment, consider the following in connection with FIG. 3 and the table just below which describes messages that are exchanged during Session Establishment.

| Message | Value | Description | |
|---|---|---|---|
| License Request Message | Ver | 8-bit Protocol Version | |
| | Cert | XML digital certificate of the Receiver. | |
| | SN | 128-bit Serial Number. | |
| | Action | Requested usage for the content. Ex.: "Play", "Copy" or "Burn". | |
| | RId | 128-bit random Rights Id. | |
| | VCRL | Version of the receiver's CRL. | |
| License Response Message | Ver | 8-bit Protocol Version | |
| | CRL | Transmitter's CRL. Only sent in case it has a higher version number than the receiver's CRL and the receiver component also has transmitting capabilities. | |
| | License | KC (encrypted with receiver's public key) | 128-bit Random Content Encryption key. |
| | | KI (encrypted with receiver's public key) | 128-bit Random Content Integrity key. |
| | | VCRL | Version of the transmitter's CRL. |
| | | RId | Same 128-bit random Rights Id sent by the receiver. |
| | | SN | 128-bit Serial Number. |

In this example, a License Request Message is sent from the receiver to the transmitter and contains the information described above. In response, the transmitter can send a License Response Message that contains the information described above.

In this particular example, the License is represented in XMR format and includes a Content Encryption key, a Content Integrity key, a Version of the Transmitter's CRL, a 128-bit Rights Id and a 128-bit Serial Number. The License also contains an OMAC calculated using the Content Integrity key using OMAC.

Figure 4:
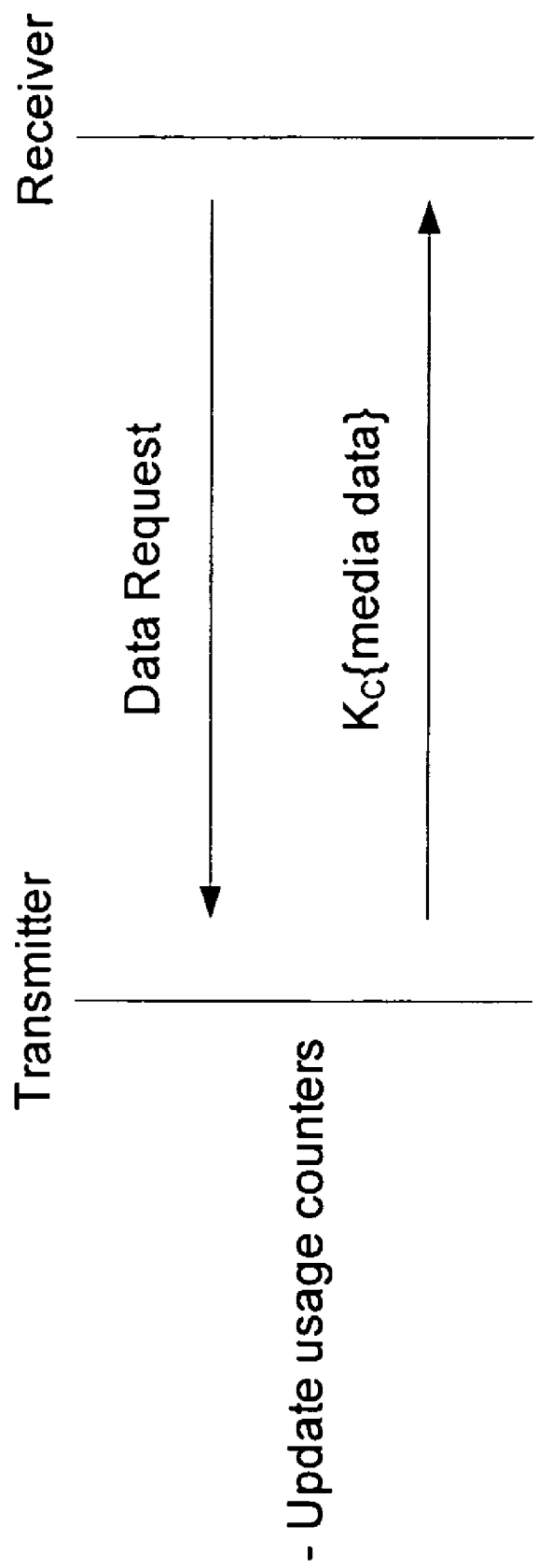
FIG. 4 illustrates an exemplary data transfer procedure of a protocol with which the inventive embodiments can be employed in one embodiment.

With regard to the Data Transfer procedure, consider the following in connection with FIG. 4. Once the Session Establishment is complete, the data transfer is executed in a control protocol specific manner. Both the Data Transfer request and response must be specifically defined for the control protocol and content type. This is conceptually represented in FIG. 4.

Having now provided a brief overview of an exemplary protocol with which the inventive embodiments can be employed, consider now some background information on RTSP.

RTSP

The Real Time Streaming Protocol or RTSP is an application-level protocol for control over the delivery of continuous media (e.g., data with real-time properties like streaming), as will be appreciated by the skilled artisan. RTSP provides an extensible framework to enable controlled, on-demand delivery of real-time data, such as audio and video. Sources of data can include both live data feeds and stored clips. This protocol is intended to control multiple data delivery sessions, provide a means for choosing delivery channels such as UDP, multicast UDP and TCP, and provide a means for choosing delivery mechanisms based upon RTP.

RTSP establishes and controls either a single or several time-synchronized streams of continuous media such as audio and video. It does not typically deliver the continuous streams itself, although interleaving of the continuous media stream with the control stream is possible. In other words, RTSP acts as a "network remote control" for multimedia servers.

The set of streams to be controlled is defined by a presentation description. In RTSP, there is no notion of an RTSP connection; instead, a server maintains a session labeled by an identifier. An RTSP session is in no way tied to a transport-level connection such as a TCP connection. During an RTSP session, an RTSP client may open and close many reliable transport connections to the server to issue RTSP requests. Alternatively, it may use a connectionless transport protocol such as UDP, as will be appreciated by the skilled artisan.

The streams controlled by RTSP may use RTP, but the operation of RTSP does not depend on the transport mechanism used to carry continuous media.

Figure 5:
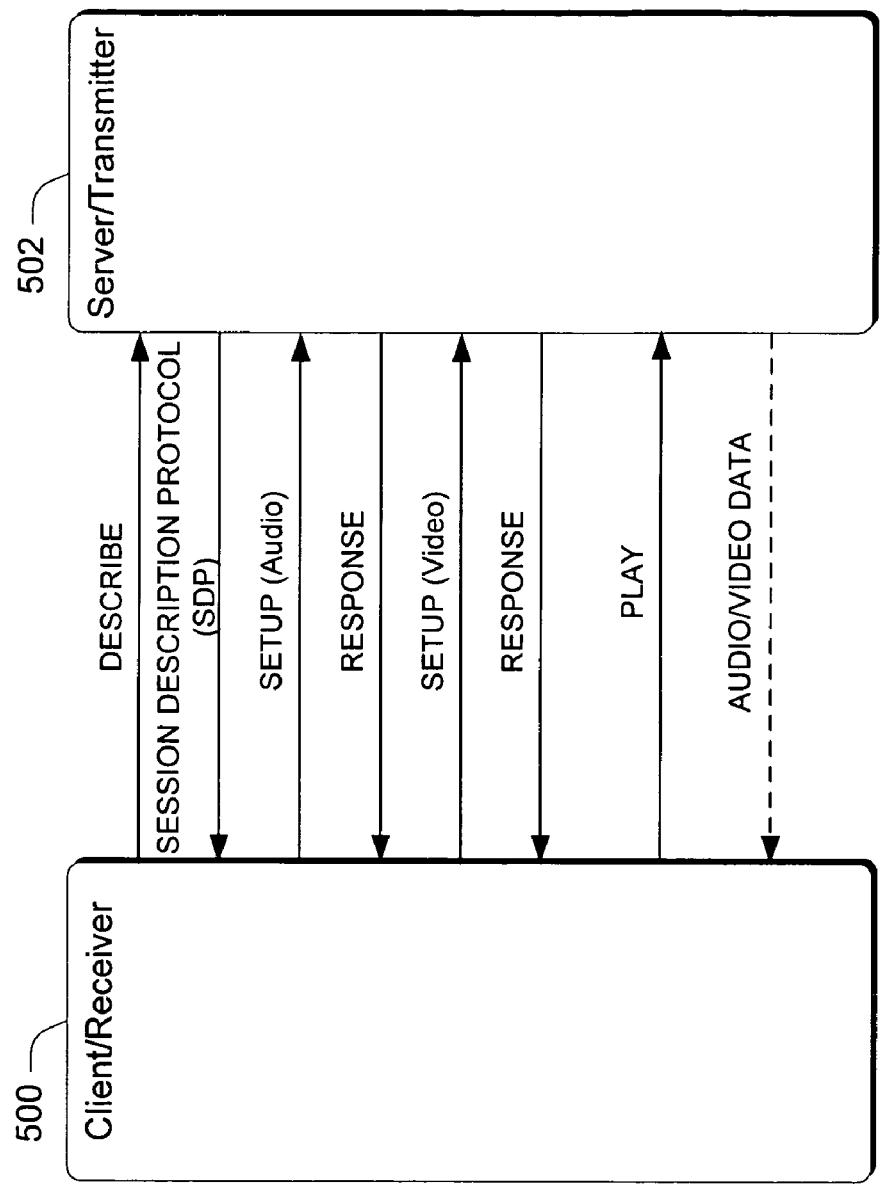
FIG. 5 illustrates aspects of a streaming protocol with which the inventive embodiments can be utilized in accordance with one embodiment.

Consider now a typical RTSP request/response exchange in connection with FIG. 5, between a client/receiver 500 and a server/transmitter 502.

Preliminarily, the RTSP requests/responses have headers which, for the sake of brevity, are not described. In RTSP, a client/receiver 500 typically issues what is known as a DESCRIBE request which is directed to retrieving a description of a presentation or media object identified by a request URL from server 502. The server 502 responds with a description of the requested resource which is represented in the SESSION DESCRIPTION PROTOCOL (SDP). The DESCRIBE response (SDP) contains all media initialization information for the resource(s) that it describes.

Next, client 500 sends a SETUP request for a URI that specifies the transport mechanism to be used for the streamed media. In the FIG. 5 example, a SETUP request is sent for both audio and video. Client 500 also indicates, in the SETUP request, the transport parameters that it will be utilizing. A transport header in the SETUP request specifies the transport parameters acceptable to the client for data transmission. The RESPONSE from server 502 contains the transport parameters selected by the server. The server also generates session identifiers in response to the SETUP requests.

At this point, the client can issue a PLAY request which tells the server to start sending data via the mechanism specified in the SETUP. Responsive to receiving a PLAY request, the server can start streaming the content which, in this example, is the audio/video content. In this example, the streaming content is encapsulated using RTP packets and is sent over UDP, as will be appreciated by the skilled artisan.

The RTSP protocol has other methods of interest which include PAUSE TEARDOWN, GET_PARAMETER, SET_PARAMETER, REDIRECT, and RECORD. For additional background on RTSP, the reader should consult the RTSP RFC, Schulzrinne, H., Rao, A., and R. Lanphier, "Real Time Streaming Protocol (RTSP)", RFC 2326, April 1998.

Root and Leaf Licenses

In the illustrated and described embodiment, the notion of a root license and leaf licenses are employed. Here, the root license is utilized to set up and securely deliver a content key (a root content key) to the client/receiver so that the client/receiver can decrypt subsequently-delivered leaf license(s). Once the root content key is securely delivered to the client/receiver, content keys for various leaf licenses (leaf content keys) can be encrypted by the server/transmitter using the root content key sent to the client/receiver. Using the root content key, the client can decrypt the leaf content keys and associated policies in the leaf licenses. Each of the leaf licenses also have a unique identifier capable of associating the leaf license with a portion of a media file. Here the unique identifier is referred to as the Key ID, or KID and for each leaf license numbered 1 to n (leaf$_{-1}$, leaf$_{-2}$, ... leaf$_{-n}$), KID$_{leaf-n}$.

Figure 6:
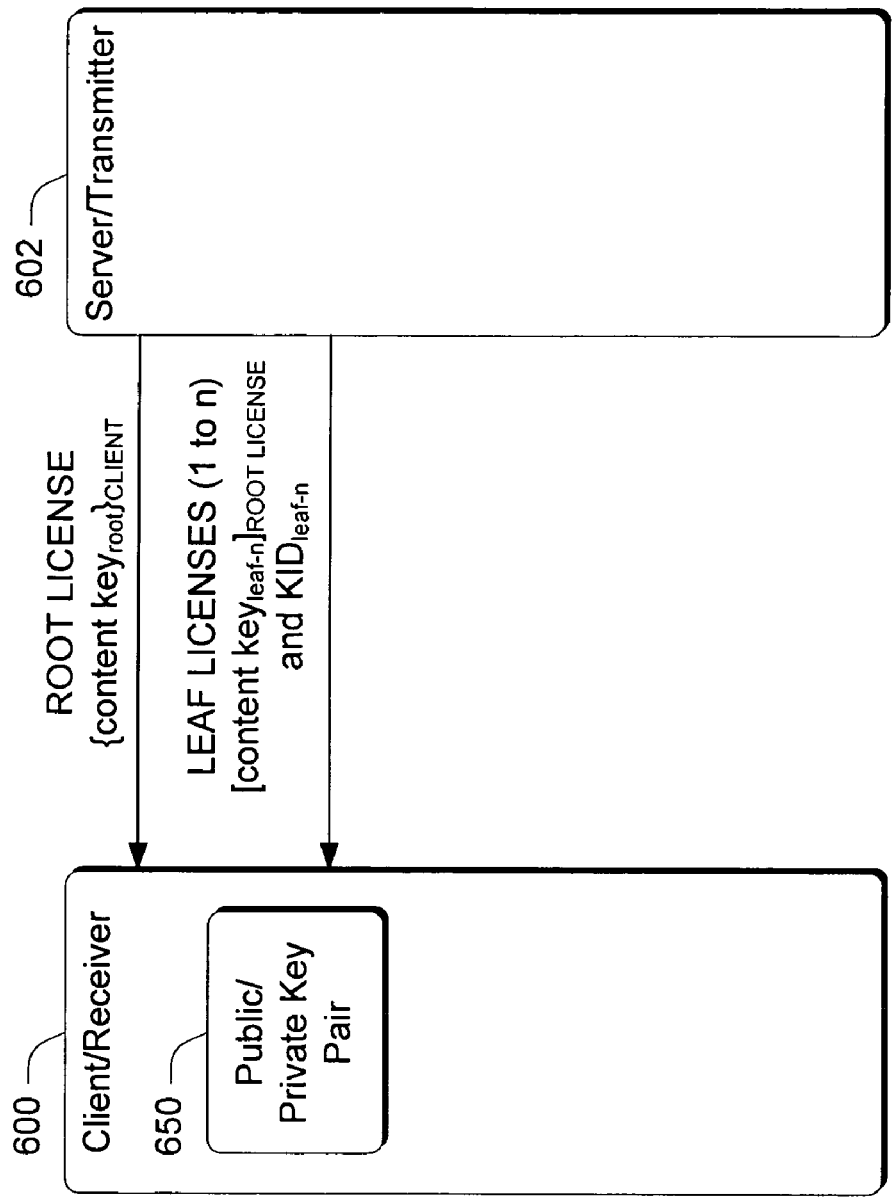
FIG. 6 illustrates aspects associated with root licenses and leaf licenses, in accordance with one embodiment.

To provide but one example of how this particular scheme can be implemented, consider the following in connection with FIG. 6. In this particular example, the system of FIG. 6 is configured to use 1024-bit RSA keys for public key cryptographic operation and 128-bit AES keys for symmetric cryptographic operations. Of course, this is provided as but one example and is not intended to limit application of the claimed subject matter.

In this example, client/receiver 600 has a public/private key pair 650 and the server/transmitter 602 has the client/receiver's public key. In this example, each of the client/receiver's public and private keys is a 1024-bit RSA key. Using the client/receiver's public key, the server/transmitter builds a root license that contains a root content key that is encrypted with the client/receiver's public key. The root content key is a 128-bit AES content key. This root license is then sent to the client/receiver. In FIG. 6, this is shown as the first communication that takes place between the client/receiver and server-transmitter, where the encrypted root content key is represented as {content key$_{root}$}$_{CLIENT}$. It is to be appreciated, however, that other communication prior to the illustrated communication can take place.

Having received the encrypted root content key from the server/transmitter, the client/receiver can now decrypt the root content key using its private key and can securely store the decrypted root content key for future use.

At this point, consider what has occurred. The server/transmitter has securely communicated a key to the client/receiver that can now serve as the basis for subsequent cryptographic operations. More specifically, consider now that multiple, particular policies may pertain to multiple, particular pieces of DRM-protected content in a single media file. In this case, the server/transmitter can prepare multiple leaf licenses each containing a digital rights management policy and an encrypted version of a particular leaf content key. In this example, each leaf content key is a 128-bit AES content key that has been encrypted using the root content key. Thus, the computational complexity and expense experienced and incurred by the client/receiver associated with decrypting new and additional leaf content keys is reduced over that associated with 1024-bit RSA key operations because now, the client/receiver only needs to decrypt using a 128-bit AES content key (i.e. the root content key).

HTTP

Having now discussed the notion of a root and leaf license and how each can be employed in the contexts described above, consider now how the root and leaf license can be delivered using HTTP.

When HTTP is utilized for carrying DRM-protected content, the client issues two requests to the server/transmitter. First, the client issues a POST request to retrieve a root license. Second, the client issues a GET request for retrieving the DRM-protected content. The client issues the requests in this example because in HTTP, the server typically cannot initiate communication with a client.

Figure 7:
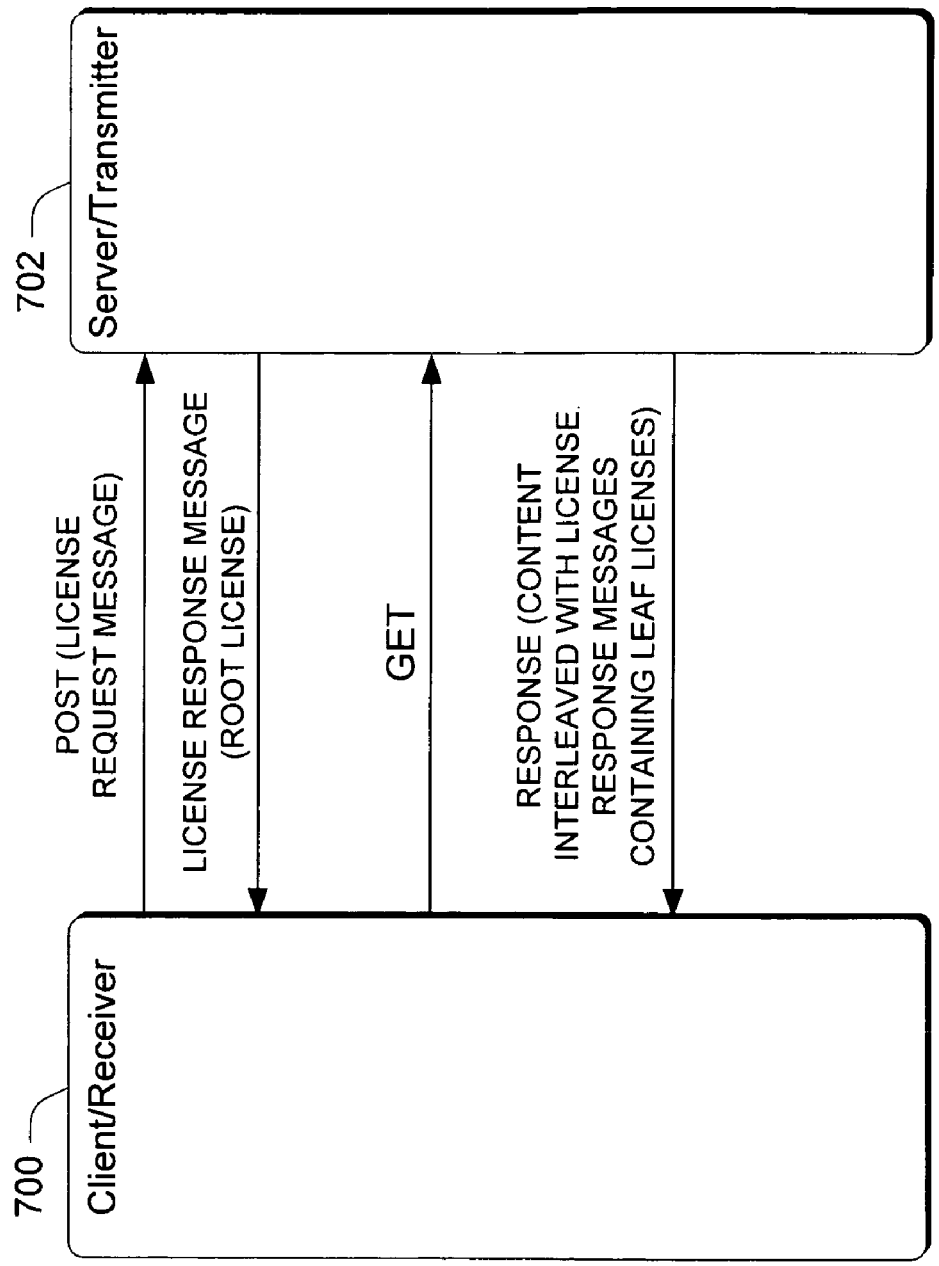
FIG. 7 illustrates aspects associated with root licenses and leaf licenses, in accordance with one embodiment.

Specifically, consider FIG. 7 in connection with the following discussion. When a client wishes to receive a root license, it issues a POST request to the server. The POST request contains a license request message, as discussed above. Responsive to receiving this communication, the server responds with a license response message that contains a root license which, in at least one embodiment, is expressed in XMR. Having received the root license and processed it accordingly, the client issues a GET request to the server asking for the DRM-protected content. Responsive to the GET request, the server replies with segments of the requested content interleaved with one or more license response messages. The license response messages each contain a leaf license that pertains to a particular portion of the DRM-protected content. Any suitable mechanism or interleaving technique can be used for formulating the server's reply.

As but one implementation example in one particular context, consider the following.

In but one example, a four-byte framing header is used to encapsulate data and control blocks. The framing header contains a one byte ASCII dollar sign (0x24), followed by a one byte block type identifier, followed by a two byte length of the encapsulated data, represented in network byte order.

| Sections | Fields |
| --- | --- |
| Header | 8-bit ASCII dollar sign (0x24) |
|  | 8-bit Block Type |
| Data Length | 16-bit Length of the encapsulated data |

A Control block uses an ASCII 'c' character (0x63) as its type identifier. This block contains a message, typically a License Response message.

A Data block uses an ASCII 'd' character (0x63) as its type identifier. This block contains a Data Segment descriptor immediately followed by media data.

The Data Segment descriptor can be associated with content that is encrypted or in the clear. An encrypted flag in the descriptor conveys this information. A Data Segment descriptor is associated with a portion of the transmitted file to which, if encrypted, a single policy and content encryption key apply. In other words, the content encryption key and policies cannot be changed within the segment.

In accordance with one embodiment, a typical HTTP response with link encryption is comprised of the following blocks:
1. Control block [$c] carrying a License Response message with a Chained License.
2. One or more Data blocks [$d].

In case there is a key or policy change during the transmission of the file, then the following steps are added:

3. A new Control block [$c] carrying a License Response message with a new Chained License.

4. One or more Data blocks [$d].

Note that steps 3 and 4 may occur multiple times in the case of multiple key or policy changes.

A Single, Encrypted Media File with Multiple Leaf Licenses

The tools enable a single encrypted media file to have portions associated with different policies. The single encrypted media file may be of an arbitrary content type (e.g., ASF, MPEG, WAV, or other files) and be transferred using various control protocols.

In the following illustrated and described embodiment of FIG. 8, a single, encrypted media file 800 has seven portions 802, 804, 806, 808, 810, 812, and 814. Assume that this media file is a media program about the history of music videos. The first portion is an introduction to music videos, the second is a music video, the third an advertisement, the fourth is another music video, the fifth is another music video, the sixth is another advertisement, and the seventh is a conclusion to the program.

Here the creator of the media program desires to have different rights for various portions. The creator may be willing to permit users of the media program to play the introduction and conclusion portions and copy them a certain number of times. The creator may not be willing to grant the same rights to the music videos; assume here that the creator of the program does not own these music videos, and so they are subject to different policies of use. The creator may also be willing to have the advertisements used freely—and thus they may be copied, used, and played in any way a user likes.

To govern the usage of each of these portions, each is associated with a policy. Here the policy is in a leaf license having a KID and content key. Assume that one root license and five leaf licenses are received for this media program. The leaf licenses are shown in FIG. 8 at 816, 818, 820, 822, and 824. Each of the leaf licenses has a unique KID ($KID_1$, $KID_2$, $KID_3$, $KID_4$, and $KID_5$) and a unique leaf content key (leaf content key$_1$, leaf content key$_2$, leaf content key$_3$, leaf content key$_4$, and leaf content key$_5$). Each leaf license also contains a policy (policy$_1$, policy$_2$, policy$_3$, policy$_4$, and policy$_5$) permitting or excluding certain rights for using the media of each of the associated portions. These leaf licenses are expressed in XMR (eXtensible Media Rights), though other languages may also be used.

The first policy (that of leaf license #1) permits media associated with it to be played up to ten times and copied up to three times. This policy permits, therefore, the introduction and the conclusion of the program to be played and copied a certain number of times.

The second policy permits media associated with it to be played only once and not copied. Thus, the first music video of the program can only be played once. If a user attempts to play the entire program a second time, this video will not play.

The third policy permits media associated with it to be used in any way desired. The policy itself can set this out—that there are no restrictions on the play, copying, or other use of associated media. In some embodiments, however, the portions of the media may instead be in the clear (not encrypted). An example of this is described below. In either case, both the first and second advertisements may be used in any way desired.

The fourth policy permits media associated with it to by played as many times as a user likes, but cannot be copied. Thus, the second music video can be played but not copied.

The fifth policy permits media associated with it to be played as many times as a user likes and copied, but only as an analog file. Thus, the third music video may be played, and copied in a certain way only.

Figure 8:
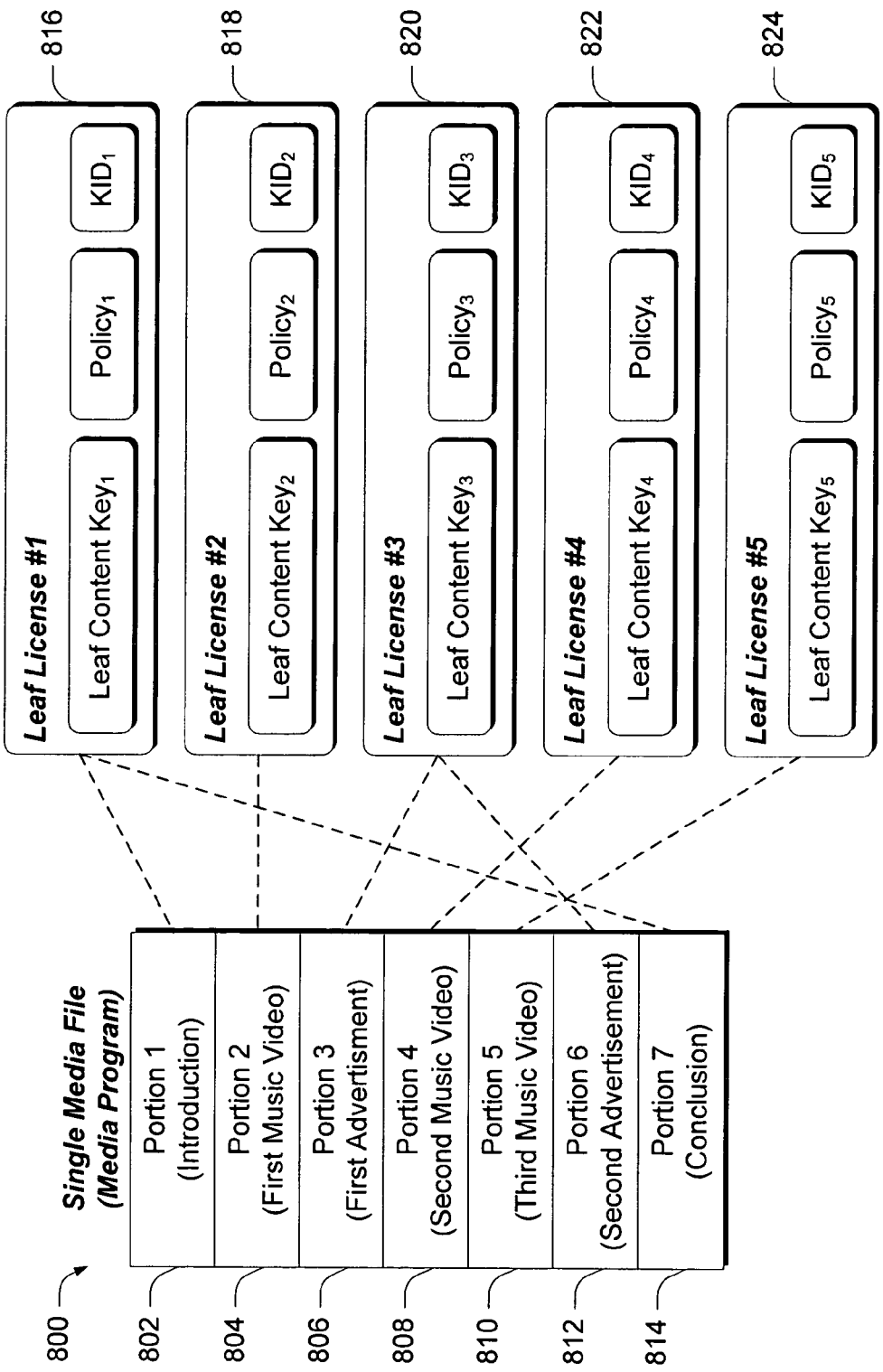
FIG. 8 illustrates an exemplary single media file having seven portions associated with five different exemplary digital rights management policies.

The association between each of the portions and the licenses are shown in FIG. 8 with dashed lines. Ways in which the tools may establish this association are set forth in greater detail below.

Descriptors

The tools can associate policies with portions of a single media file. Continuing the illustrated and described embodiment of FIG. 8, each of the portions is associated with a policy through a leaf license. To better explain how this association may be established, one portion of single media file 800 is illustrated in greater detail.

Figure 9:
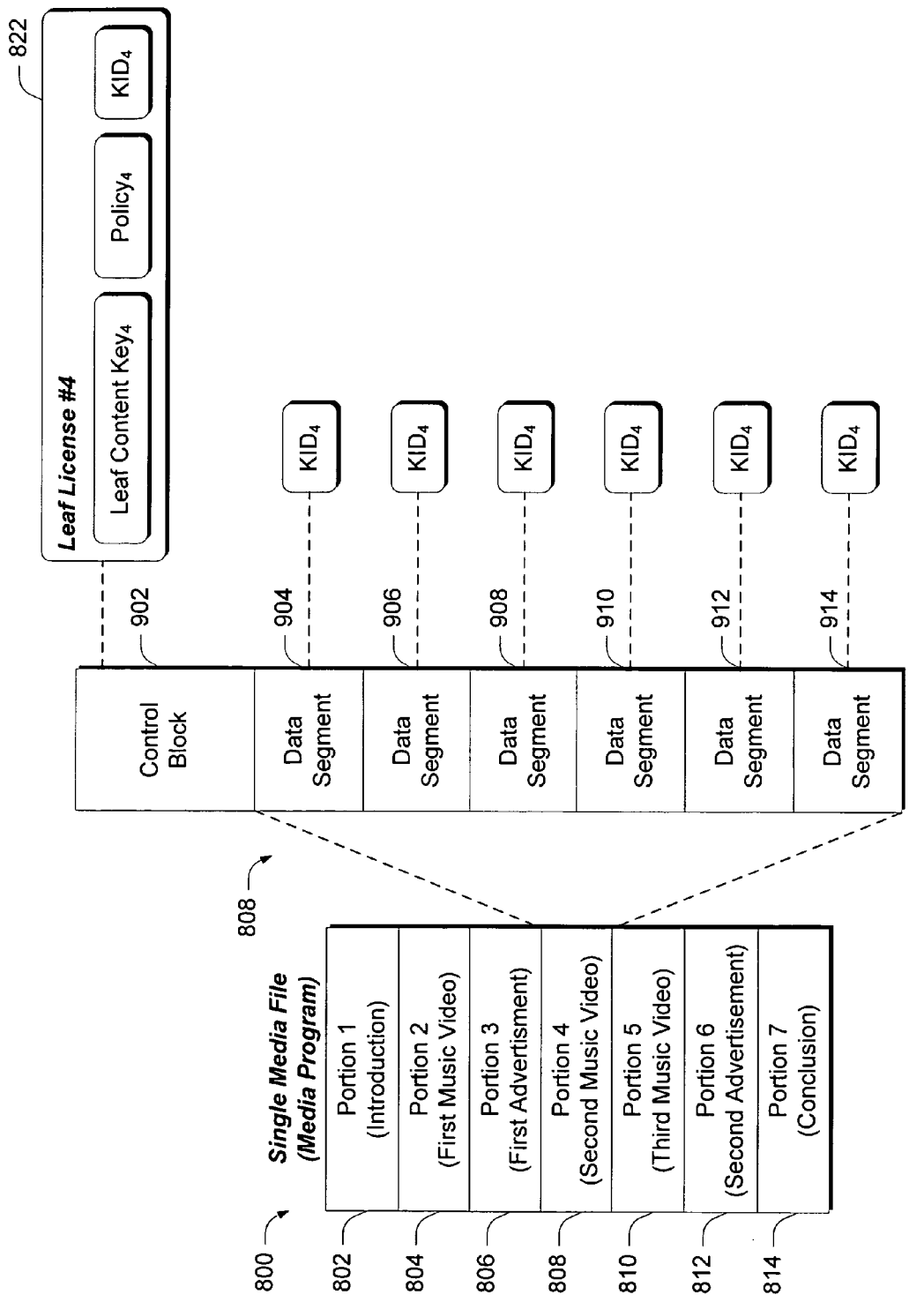
FIG. 9 illustrates the single media file of FIG. 8 with exemplary data segments associated with Key IDs (KIDs).

FIG. 9 illustrates media file 800 with fourth portion 808 expanded to show one way in which this portion can be associated with a policy. Here the media file is received with the portions generally in order. In this example the root license is received, followed by a first leaf license, followed by the first portion of the media file, followed by the second leaf license, followed by the second portion, and so on. Here the leaf licenses are not all received prior to receiving the beginning of the media file as described above. Because of this, the first and third leaf licenses may be sent again prior to the portion associated with them (thus, the first leaf license may be sent before the first portion and again before the seventh portion).

When a new policy is to be followed for a portion of the media file, a new leaf license (here fourth leaf license 822) is sent prior to the portion of the media associated with the fourth leaf license.

Here the leaf license is sent as part of a control block 902, followed by data segments 904-914 of fourth portion 808. In RTSP, however, the licenses are delivered in SDP descriptors or ANNOUNCE messages. This particular embodiment focuses on use of HTTP, though use and communication of leaf licenses and data may also use RTSP, such as is set forth in the description relating to FIG. 7 above. The control block comprises leaf license 822 of FIGS. 8 and 9. The leaf license has the leaf content key$_4$, the policy$_4$, and the $KID_4$. Once received, the fourth leaf license can be decrypted using the root content key. The KID can be sent in the clear or encrypted but capable of being decrypted.

Each of the data segments is associated with a policy, here data segments 904-914 are associated with the corresponding fourth policy. This association is established with the KID of the fourth leaf license. The KID, or an identifier associated with the KID, is stored in each data segment. The KID can be a relatively short piece of information, even an integer taking up less than a byte of memory. Thus, the receiver can associate the data segment with the appropriate policy based on the KID indicating the appropriate policy.

The descriptor can be used with various control and data protocols and packet structures now in existence or that may be created in the future. One such exemplary data protocol is RTP. Here the descriptor is oriented appended to the end of each packet. In another embodiment, an HTTP control protocol is used. Here the descriptor is oriented appended at the beginning of each frame.

Figure 10:
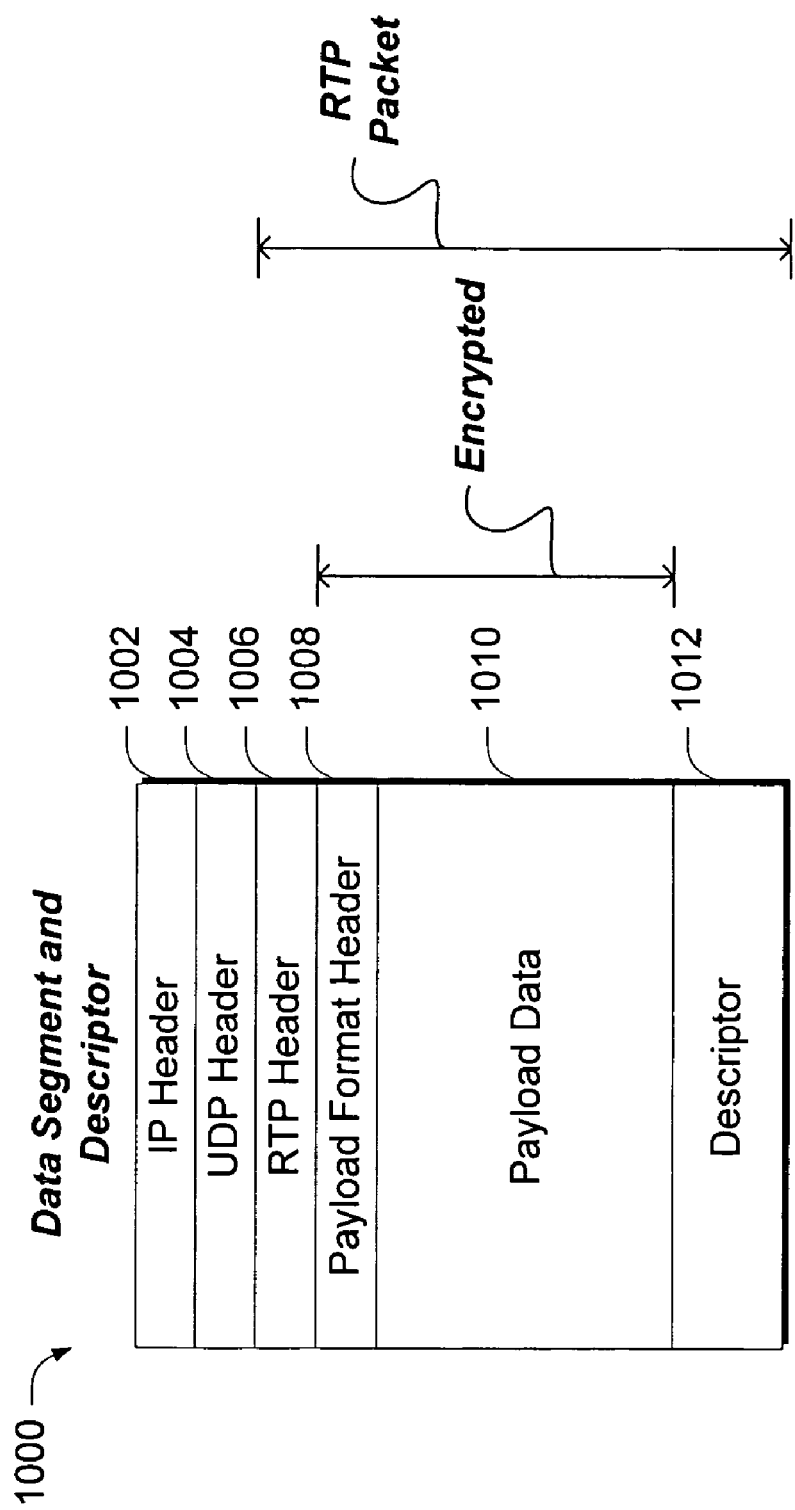
FIG. 10 illustrates, for a data segment shown in FIG. 9, a packet in accordance with one embodiment.

FIG. 10 illustrates a descriptor associating a data segment with a leaf license in accordance with RTSP.

In this example, data segment 1000 can include an RTP payload format header 1008 and payload data 1010. Here the payload data and payload format header are encrypted, an example of which is described as part of FIG. 11 below.

Here the descriptor is appended to the end of the payload data according the RTP protocol, though it can be placed at any suitable location permitted by the data protocol. Placing the descriptor at the end of the payload data can mitigate backward compatibility issues, as will be appreciated by the skilled artisan.

In this embodiment, the RTP packet—with the exception of the RTP header—is associated with the descriptor 1012. Descriptor 1012, in turn, carries with it the encryption parameters that can be used in a decryption process that enables payload data 1010 and RTP payload format header 1008 to be decrypted (e.g., the Initialization Vector (IV) associated with the fourth leaf content key). In this particular example, a single policy and content encryption key applies to the payload data 1010.

In accordance with one embodiment, descriptor 1012 comprises a data structure as follows:

| Sections | Fields |
| --- | --- |
| Flags | 8-bit Flags |
| Extensions | 8-bit Number of Extensions |
|  | Multiple Variable Length Extensions |
| Length | Data Segment Descriptor Length |

In this example, the Flags section is a bit-field indicating attributes of the Data Segment. The following bit is currently defined: Bit 0 (Encrypted Data.) When this bit is set to 1, it indicates that the Data Segment is in encrypted form. Otherwise, the Data Segment is in the clear.

The extension section comprises the KID and IV; here the KID is the $KID_4$ and the IV is associated with the leaf content $key_4$.

With regard to the Extensions section, the Number of Extensions field indicates the number of variable length extensions included in this descriptor. With regard to the Variable Length Extension field, each extension has the following format:

| Fields |
| --- |
| 8-bit Extension Type |
| 16-bit Extension Length |
| Variable Length Extension |

In accordance with one embodiment, the KID and IV are defined as follows:

KID

Extension Type: Must be set to 1 for Key ID Extension.

Extension Length: Must be set to 16, which represents 128 bits (16 bytes).

Extension: Must contain the Key ID value for the encrypted media delivered in conjunction with this descriptor. This extension is only used when the Encrypted Data flag is set to 1.

Initialization Vector (IV)

Extension Type: Must be set to 2 for Initialization Vector Extension.

Extension Length: Must be set to 8, which represents 64 bits (8 bytes).

Extension: Must contain the Initialization Vector for the encrypted media delivered in conjunction with this descriptor. This extension is only used when the Encrypted Data flag is set to 1.

With regard to the Length section, in this embodiment, this section must contain the total length of the descriptor in bytes. This length does not include the size of the media data delivered in conjunction with this descriptor.

Content-Independent Data Encryption

Figure 11:
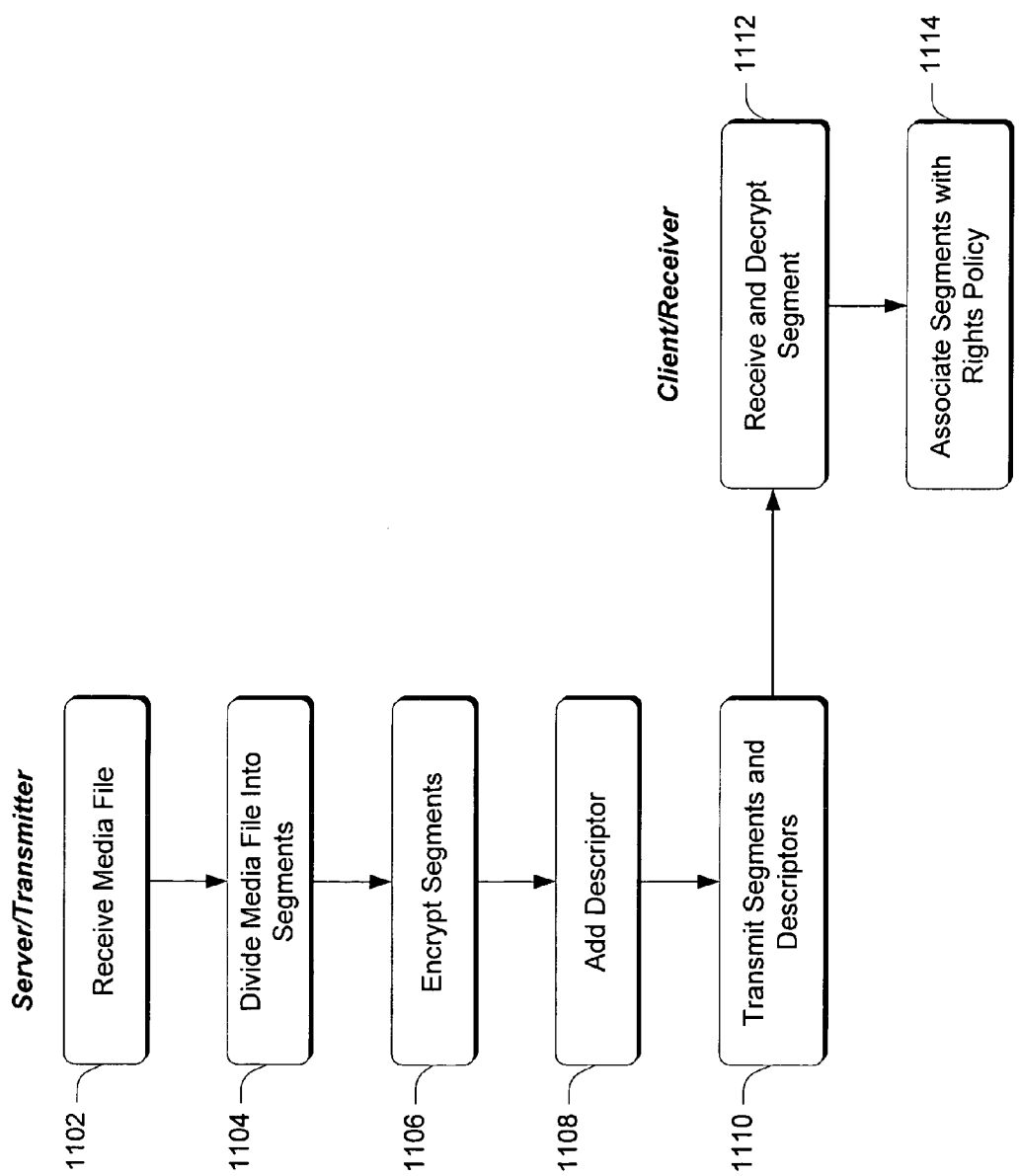
FIG. 11 is a flow diagram showing one manner in which the tools enable content-independent encryption and decryption.

FIG. 11 is a flow diagram that describes steps in a method in accordance with one embodiment. This method can be performed in connection with any suitable hardware, software, firmware or combination thereof In one embodiment, the method can be implemented in connection with systems, such as those illustrated and described above. Additionally, in the discussion that follows, some of the acts that are performed are depicted as being performed by a server/transmitter, and other acts are depicted as being performed by a client/receiver. Examples of server/transmitters and client/receivers are provided above.

Step 1102 receives a media file. The media file can have any content type permitting the media file to be broken into data segments, encrypted, transmitted, received, and decrypted. It can be, for instance, an ASF, MPEG2 TS, MPEG2 ES, or WAV file.

Step 1104 divides the media file into data segments. These data segments can comprise packets, other pieces of data, or frames conforming to various controls protocols, such as RTP or HTTP.

Step 1106 encrypts each data segment. Step 1106 may do so according to any of the embodiments described herein. Thus, it may encrypt the payload data with a leaf content key and encrypt that leaf content key with a root content key. With the root content key, a receiver may later decrypt the leaf content key and use that leaf content key to decrypt the payload data.

Figure 12:
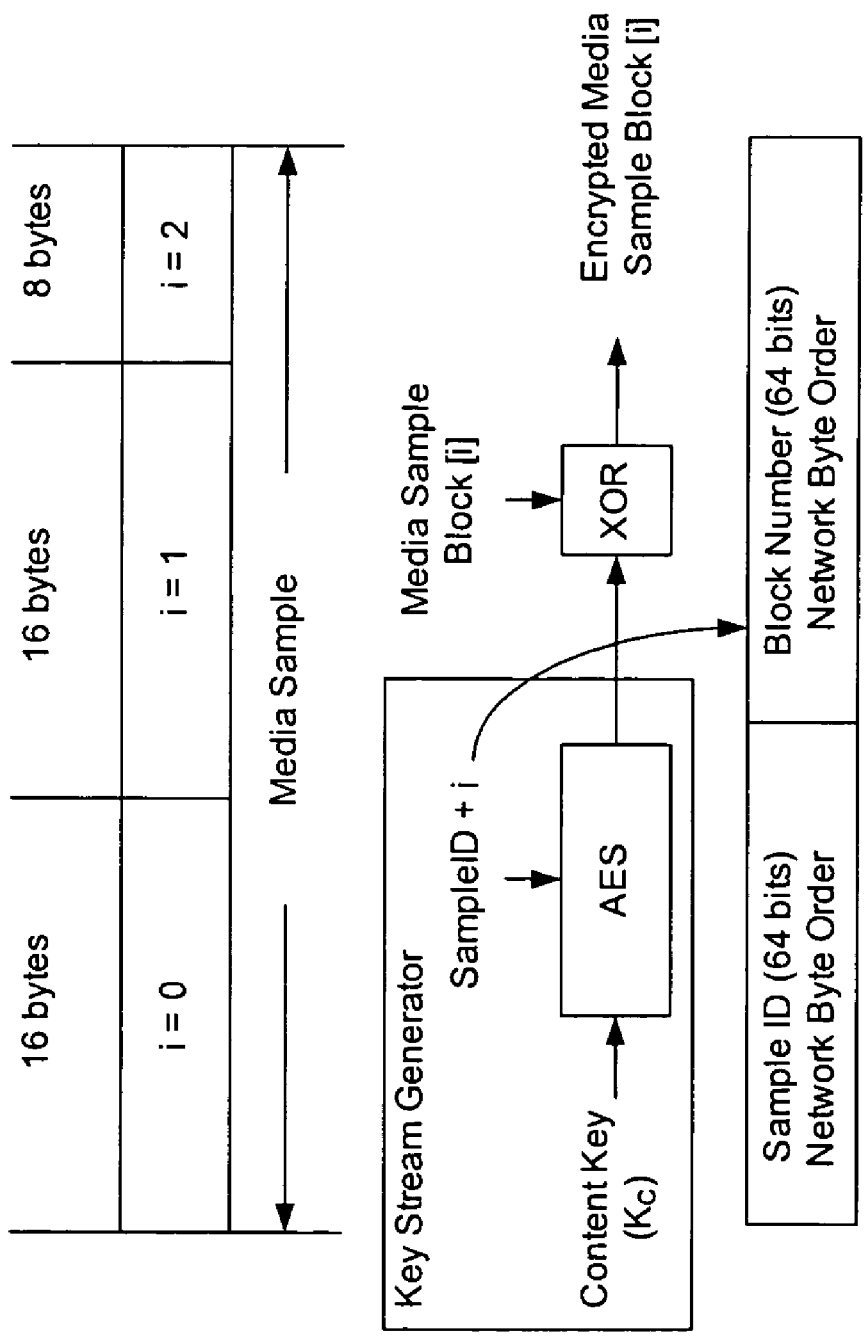
FIG. 12 illustrates sample encryption in accordance with one embodiment.

In one embodiment, step 1106 encrypts each data segment or part thereof using an AES in Counter mode. FIG. 12 illustrates a process for encrypting a single data segment using this technique. In this embodiment, Counter mode creates a stream of bytes that are then XOR'd with the clear text bytes of the data segment to create the encrypted data segment. The Key Stream Generator uses an AES round to generate 16-byte blocks of key stream at a time. The inputs to the AES round are the Content Encryption key ($K_C$) (e.g., the leaf content key) and the 128-bit concatenation of a Data Segment ID and the block number within the data segment.

The output of key stream generator should be XOR'd byte by byte with the data from the corresponding block (i) of the data segment. In the case that the data segment is not evenly divisible by 16 bytes only the valid bytes of the media data from the last block should be XOR'd with the key stream and retained for the encrypted data segment.

Step 1108 adds a descriptor to each encrypted data segment. The descriptor can comprise a KID, IV, or other elements set forth herein. Each descriptor indicates an associated digital rights management policy by which the payload data of the data segment should be governed. This digital rights management policy, according to one embodiment above, is contained within a previously-received leaf license. Each descriptor can also indicate a content key (e.g., a particular leaf content key) usable to decrypt the data segment.

Note that the result of these steps can be a media file of an arbitrary content type broken into data segments, each data segment encrypted and having a descriptor by which the encrypted data can later be associated with a digital rights management policy.

In one embodiment, the descriptor contains a length indicator. With this length indicator, a receiver of an encrypted data segment can determine when the descriptor ends or begins. This length indicator permits the descriptor to be added to an encrypted data segment at various locations in the data segment or its packet. For the RTP protocol, for instance, the descriptor is added to the end of an RTP packet having the data segment. For the HTTP protocol, for instance, the descriptor is added to the beginning of the frame having the data segment. Note that the descriptor, by having a discernable length, can be added to various portions of a data segment and thus enable use of the descriptor with various transfer protocols.

Step 1110 transmits the encrypted data segments (and clear data segments, if any) with descriptors to a receiver. The receiver is enabled to orient (e.g., place in correct order) the data segments in manners known in the art. The receiver may decrypt the data segments using a content key associated with the data segments. Further, the receiver, using the descriptor, can determine what rights policy should be used with the media file or a portion thereof. If the media file has portions that should be governed by different rights policies, this method can also divide the data segments based on their portion of the media file and assign different descriptors to data segments of different portions in step 1104.

Step 1112 receives and decrypts the encrypted data segments. A receiver (such as client/receiver 500 or 600) decrypts the data segments and assigns the appropriate rights policy to them based on their descriptor. In one embodiment, the receiver decrypts the data segments using an Initialization Vector in the descriptor. The receiver determines the appropriate leaf content key based on the KID, which it then uses to decrypt the data segments after decrypting the leaf content key with a root content key.

Step 1114 associates each data segment with a rights policy. In one embodiment, the receiver does so using a Key ID (KID) found in the descriptor and in the leaf license having the rights policy.

Using Root and Leaf Licenses

Figure 13:
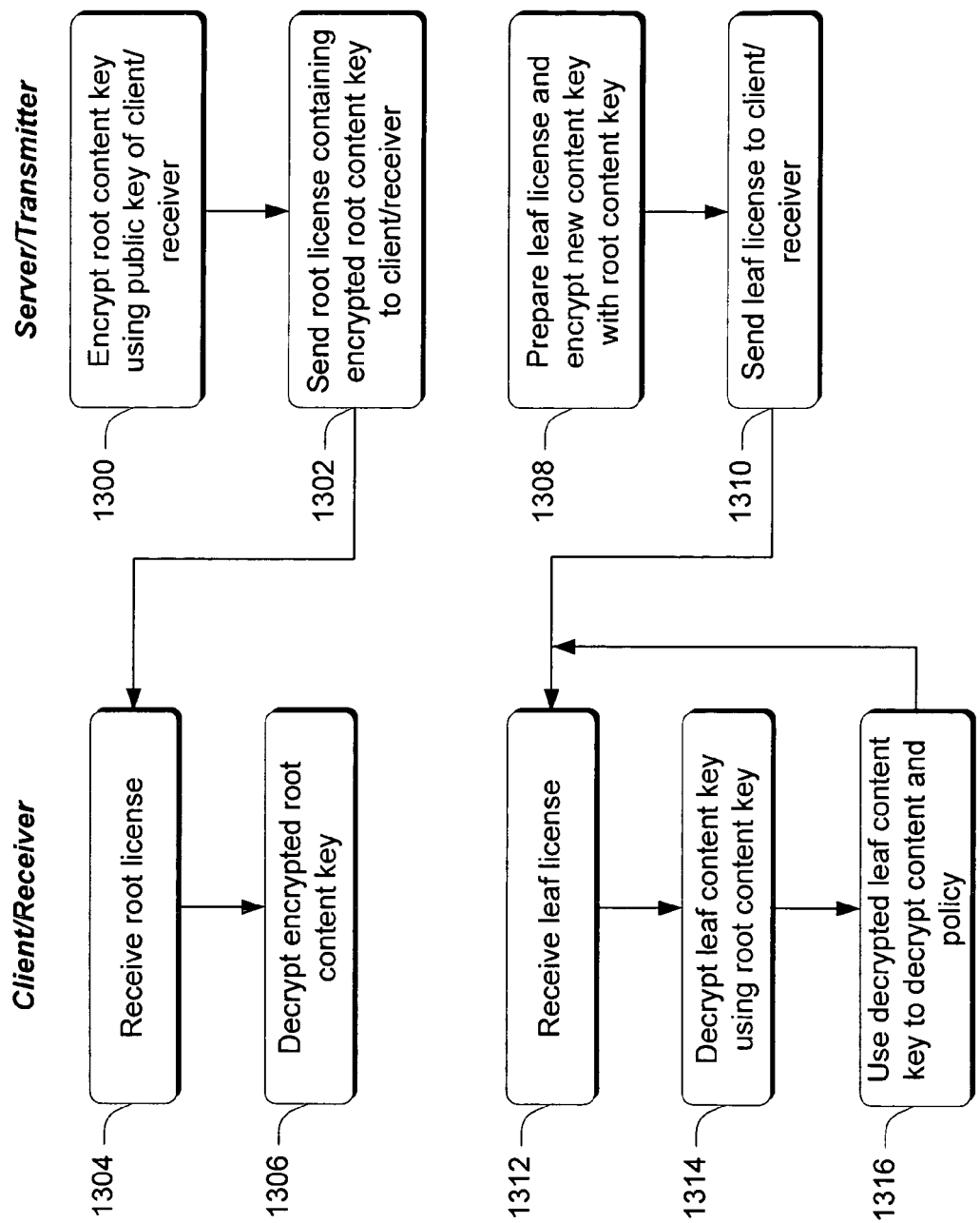
FIG. 13 is a flow diagram showing communication of root and leaf licenses in accordance with one embodiment.

FIG. 13 is a flow diagram that describes steps in a method in accordance with one embodiment. This method can be performed in connection with any suitable hardware, software, firmware or combination thereof. In one embodiment, the method can be implemented in connection with systems, such as those illustrated and described above. Additionally, in the discussion that follows, some of the acts that are performed are depicted as being performed by a server/transmitter, and other acts are depicted as being performed by a client/receiver. Examples of server/transmitters and client/receivers are provided above.

Step 1300 encrypts a root content key using a public key of a client/receiver. Any suitable content key can be utilized with but one example being given above. Step 1302 sends a root license containing the encrypted root content key to a client/receiver. Any suitable method can be utilized to implement this step. In the discussion that follows, two specific examples that draw upon two different protocols are provided. It is to be appreciated and understood that these constitute examples and are not intended to limit application of the claimed subject matter to only the specific protocols that are described.

Step 1304 receives the root license sent by the server/transmitter and step 1306 decrypts the encrypted root content key. In this example, this step is performed by using the client/receiver's private key to decrypt the encrypted root content key.

Step 1308 prepares a leaf license and encrypts a leaf content key with the root content key. Step 1310 sends the leaf license to the client/receiver. Recall that the leaf license can and typically does contain policies for DRM-protected content. It should be understood and appreciated that steps 1308 and 1310 can be executed multiple times for a given piece of DRM-protected content. That is, for each portion having a different policy, a corresponding leaf license can be prepared and sent to the client/receiver.

Step 1312 receives the leaf license and step 1314 decrypts the leaf content key using the root content key that was previously received. Step 1316 then uses the decrypted leaf content key to decrypt content. It also associates the appropriate leaf license with a portion of the media file (if the media file has portions) using a descriptor described above.

It is to be appreciated and understood that steps 1312, 1314 and 1316 can be performed for each new leaf license that is received by the client/receiver.

CONCLUSION

This document describes techniques by which a digital rights management policy may be associated with digital media having an arbitrary content type or transfer control protocol. In some cases this enables a receiver of an encrypted media file to decrypt the file and consume portions of the file according to different digital rights management policies. In some cases this also permits a transmitter to encrypt many different types of media files with one set of techniques. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method with a client-receiver computer having a public/private key pair, and at least one server-transmitter computer having a public key of the client-receiver computer, the method comprising steps of:
   generating a root content key using the public key of the client-receiver computer;
   transmitting the root content key to the client-receiver computer, the root content key being decryptable using the client-receiver computer's private key and usable by the client-receiver computer to decrypt leaf content keys;
   dividing a single media file into multiple data segments, each data segment associated with a different digital rights management policy;
   encrypting each of the data segments with a respective leaf content key to provide encrypted data segments
   appending a descriptor to each of the encrypted data segments, each descriptor identifying the leaf content key with which the data segment was encrypted and the associated digital rights management policy; and
   transmitting the encrypted data segments and descriptors to the client-receiver computer.

2. The computer-implemented method of claim 1, wherein the encrypting the data segments uses an AES in counter mode.

3. The computer-implemented method of claim 1, wherein each of the descriptors comprises Initialization Vectors, each Initialization Vector associated with a Key ID identifying the appropriate designated rights policy.

4. The computer-implemented method of claim 1, wherein each of the descriptors has a Key ID that is also in the associated digital rights management policy.

5. The computer-implemented method of claim 1, wherein each of the descriptors comprises a length indicator enabling differentiation between the encrypted data segment and each of the descriptors.

6. The computer-implemented method of claim 1, wherein the encrypted data segments comprise at least one of a packet conforming to an RTP data protocol or a frame conforming to an HTTP protocol.

7. The computer-implemented method of claim 6, wherein the adding descriptors concatenates each of the descriptors to an end of the encrypted data segments if the encrypted data segments comprise a packet conforming to the RTP protocol or the beginning of the encrypted data segments if the encrypted data segments comprise a frame conforming to the HTTP protocol.

8. A system comprising one or more computer-readable media not consisting of a propagated signal, the one or more computer-readable media comprising:
   a digital media file comprising:
      one or more data segments, each data segment having a different digital rights management policy, each of the data segments added to a descriptor and comprising:
         payload data encrypted with a respective leaf content key, each leaf content key encrypted by a root content key that is encrypted using a public key and decryptable using a private key of a public-private key pair, wherein each descriptor includes at least the associated leaf content key enabling decryption of the encrypted payload data and association of the encrypted payload data with the digital rights management policy.

9. The system of claim 8, wherein each descriptor comprises a Key ID that identifies the digital rights management policy.

10. The system of claim 8, wherein each of the encrypted payload data is encrypted using a content key, and each descriptor comprises a Key ID associated with the leaf content key that is usable to decrypt the encrypted payload data.

11. The system of claim 8, wherein the digital media file further comprises one or more portions, each of the first portions having one or more data segments, and wherein further each descriptor enables each of the portions to be associated with the digital rights management policy.

12. The system of claim 8, wherein each of the data segment's payload data is encrypted and its descriptor is not encrypted.

13. The system of claim 8, wherein the digital media file further comprises one or more data segments added to a descriptor and comprises clear payload data, wherein further each data segment's descriptor enables association of the clear payload data with digital rights management policy.

14. The system of claim 8, wherein the digital media file is streaming media.

15. A computer-implemented method for communicating a media file with multiple portions to a client-receiver computer from a server-transmitter computer performing the steps of:
   encrypting a root content key using a public key of the client-receiver computer, the root content key being decryptable with a private key of the client-receiver computer;
   transmitting the root content key to the client-receiver computer;
   dividing the media file into multiple portions, each portion having a different designated rights policy indicating permitted usage of the associated portion;
   generating multiple leaf content keys, each leaf content key being generated for an associated portion of the media file, wherein generating each leaf content key comprises encrypting each leaf content key with the root content key;
   building a descriptor for each portion of the media file, each descriptor identifying the leaf content key and the associated designated rights policy;
   encrypting each portion of the media file with the associated leaf content key;
   transmitting the encrypted portions and the descriptors to the client-receiver computer; and
   the client-receiver computer decrypting each leaf content key using the root content key and decrypting each of the portions using the associated leaf content key specified in the descriptor associated with each portion.

16. The computer-implemented method of claim 15, further comprising transmitting the designated rights policy to the receiver.

17. The computer-implemented method of claim 15, wherein the decrypting each of the portions builds a Key ID into the descriptor for each of the portions, wherein the Key ID is used by the client-receiver computer to associate the portion with the appropriate designated rights policy.

18. The computer-implemented method of claim 15, further comprising receiving a media file of an arbitrary content type and encrypting the media file to provide the encrypted media file.

* * * * *